US009760352B2

(12) United States Patent
Nakashima et al.

(10) Patent No.: US 9,760,352 B2
(45) Date of Patent: Sep. 12, 2017

(54) PROGRAM OPTIMIZATION METHOD, PROGRAM OPTIMIZATION PROGRAM, AND PROGRAM OPTIMIZATION APPARATUS

(71) Applicant: FUJITSU LIMITED, Kawasaki-shi, Kanagawa (JP)

(72) Inventors: Shusaku Nakashima, Numazu (JP); Toshiya Naito, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 263 days.

(21) Appl. No.: 14/799,625

(22) Filed: Jul. 15, 2015

(65) Prior Publication Data

US 2016/0048380 A1    Feb. 18, 2016

(30) Foreign Application Priority Data

Aug. 13, 2014    (JP) .................................. 2014-164671

(51) Int. Cl.
*G06F 9/45* (2006.01)
*G06F 11/34* (2006.01)

(52) U.S. Cl.
CPC ............ *G06F 8/443* (2013.01); *G06F 8/4452* (2013.01); *G06F 11/3409* (2013.01); *G06F 11/3419* (2013.01); *G06F 11/3466* (2013.01); *G06F 2201/81* (2013.01); *G06F 2201/865* (2013.01)

(58) Field of Classification Search
None
See application file for complete search history.

(56) References Cited

U.S. PATENT DOCUMENTS 5,522,074 A  *  5/1996  Endo ....................... G06F 8/433
                                                                                     717/150
5,579,520 A  *  11/1996 Bennett ..................... G06F 8/54
                                                                                     717/130
5,857,088 A  *  1/1999  Keith .................. G06F 9/30072
                                                                                     341/65

(Continued)

FOREIGN PATENT DOCUMENTS

JP        63-000632      1/1988
JP        8-263298       10/1996

(Continued)

OTHER PUBLICATIONS

Kim et al., "Efficient SIMD code generation for irregular kernels," 2012, Proceedings of the 17th ACM SIGPLAN symposium on Principles and Practice of Parallel Programming, pp. 55-64.*

(Continued)

*Primary Examiner* — Thuy Dao
*Assistant Examiner* — Stephen Berman
(74) *Attorney, Agent, or Firm* — Fujitsu Patent Center

(57) ABSTRACT

A program optimization method, executed by an arithmetic processing device, includes collecting profile information including a runtime analysis result by causing a computer to execute an original program to be optimized, calculating a calculation wait time based on the profile information, and generating a tuned-up program, when the calculation wait time is longer than a first threshold, by inserting an SIMD operation control line that performs an SIMD operation for an instruction in IF statement in the loop when an SIMD instruction ratio in the loop in the original program is lower than a second threshold.

6 Claims, 24 Drawing Sheets

(56) References Cited

U.S. PATENT DOCUMENTS

| | | | |
|---|---|---|---|
| 6,134,710 A | 10/2000 | Levine et al. | |
| 6,279,152 B1* | 8/2001 | Aoki | G06F 8/4442 712/E9.047 |
| 7,496,908 B2* | 2/2009 | DeWitt, Jr. | G06F 8/443 717/154 |
| 9,063,754 B2* | 6/2015 | Felch | G06F 8/4441 |
| 2004/0003381 A1* | 1/2004 | Suzuki | G06F 8/452 717/150 |
| 2004/0019886 A1* | 1/2004 | Berent | G06F 8/447 717/158 |
| 2005/0155026 A1* | 7/2005 | DeWitt, Jr. | G06F 8/443 717/158 |
| 2007/0174830 A1* | 7/2007 | Gan | G06F 8/443 717/153 |
| 2008/0184209 A1* | 7/2008 | LaFrance-Linden | G06F 8/443 717/130 |
| 2008/0184214 A1* | 7/2008 | Archer | G06F 11/3404 717/155 |
| 2010/0242025 A1 | 9/2010 | Yamazaki et al. | |
| 2011/0185347 A1* | 7/2011 | Rose | G06F 8/4441 717/160 |
| 2013/0254754 A1* | 9/2013 | Rajaraman | G06F 8/456 717/149 |
| 2013/0262842 A1* | 10/2013 | Chiba | G06F 9/30094 712/226 |
| 2014/0095850 A1* | 4/2014 | Plotnikov | G06F 9/38 712/241 |
| 2014/0237460 A1* | 8/2014 | Schmidt | G06F 8/443 717/160 |
| 2014/0258677 A1* | 9/2014 | Sasanka | G06F 8/456 712/7 |
| 2015/0268940 A1* | 9/2015 | Baghsorkhi | G06F 8/452 717/160 |

FOREIGN PATENT DOCUMENTS

| | | |
|---|---|---|
| JP | 2000-035894 | 2/2000 |
| JP | 2010-218367 | 9/2010 |

OTHER PUBLICATIONS

Barthe et al., "From relational verification to SIMD loop synthesis," 2013, Proceedings of the 18th ACM SIGPLAN symposium on Principles and practice of parallel programming, pp. 123-124.*

Nuzman et al., "Outer-loop vectorization: revisited for short SIMD architectures," 2008, Proceedings of the 17th international conference on Parallel architectures and compilation techniques, pp. 2-11.*

* cited by examiner

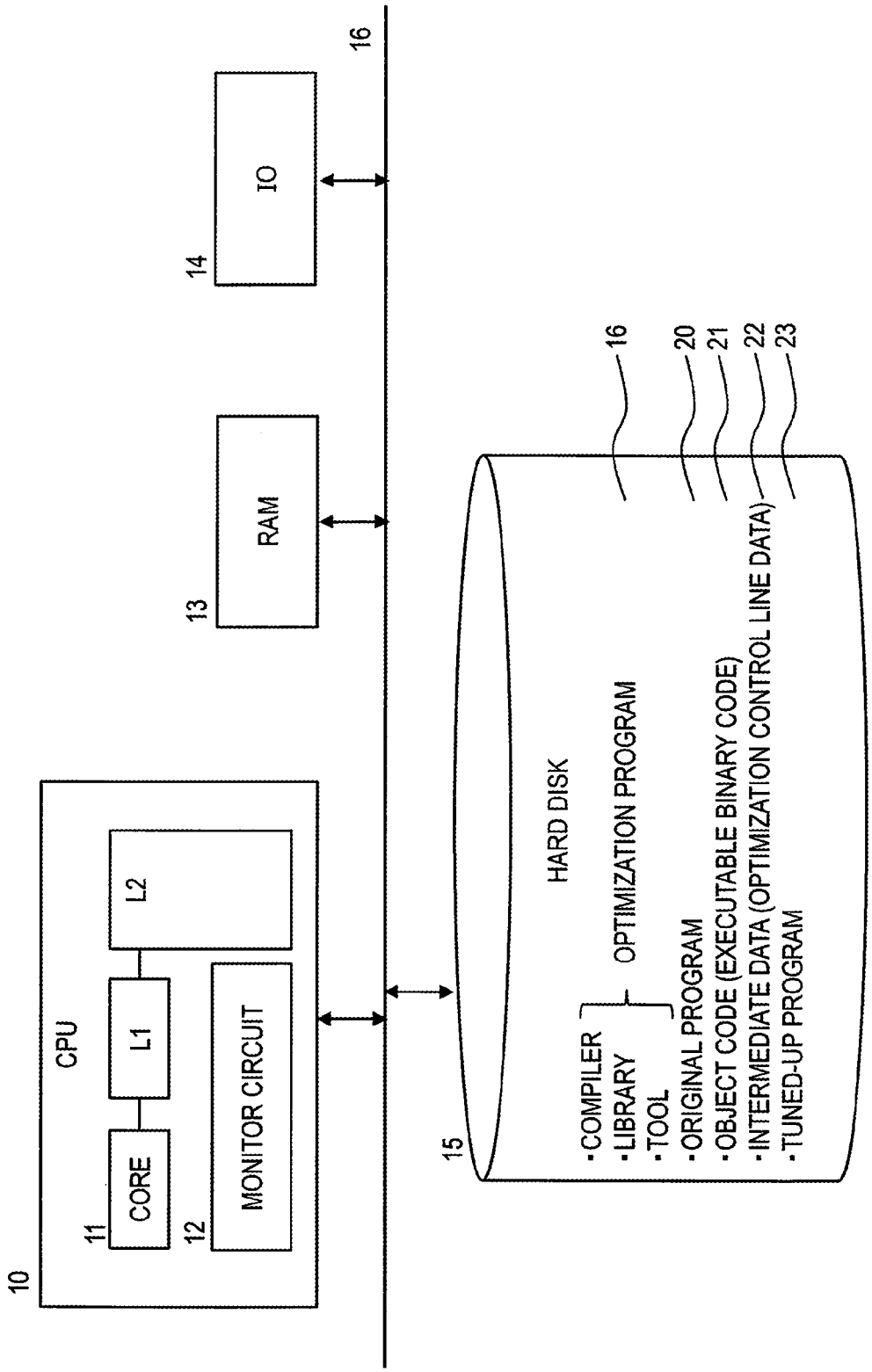

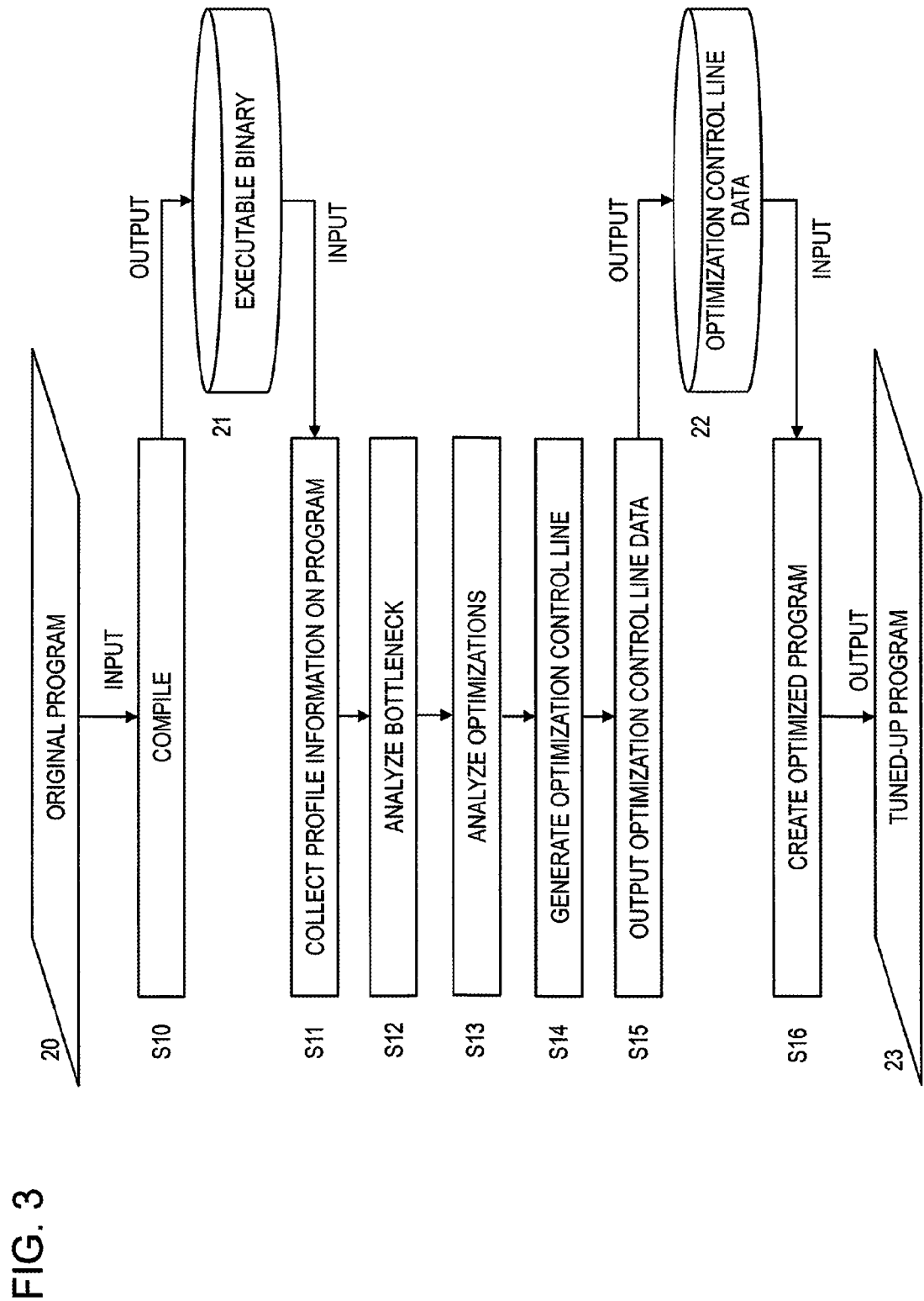

FIG. 4

EXAMPLE OF AN EXECUTABLE BINARY CODE FOR THE PURPOSE OF COLLECTING PROFILE INFORMATION

```
subroutine sub(a,b,p,n1,iter)
    real(8),dimension(n1) :: a,b,p
    real(8),Parameter :: c0 = 1.999_8,   c1 = 0.4449_8,
&                       c2 = 0.4449_8,   c3 = 0.6667_8,
&                       c4 = 2.001_8,    c5 = 0.5001_8,
&                       c6 = 2.001_8,    c7 = 0.5001_8,
&                       c8 = 1.999_8,    c9 = 0.5001_8
    call STAR_COLLECTION("region_1")
!$omp parallel
    do j=1,iter
!$omp do
        do i=1,n1
            if (p(i) > 0.0) then
                b(i) = c0 + a(i)*(c1 + a(i)*(c2 + a(i)*(c3 + a(i)*
&                       (c4 + a(i)*(c5 + a(i)*(c6 + a(i)*(c7 + a(i)*
&                       (c8 + a(i)*c9))))))))
            endif
        enddo
!$omp enddo
    enddo
!$omp end parallel
    call STOP_COLLECTION("region_1")
end subroutine sub
```

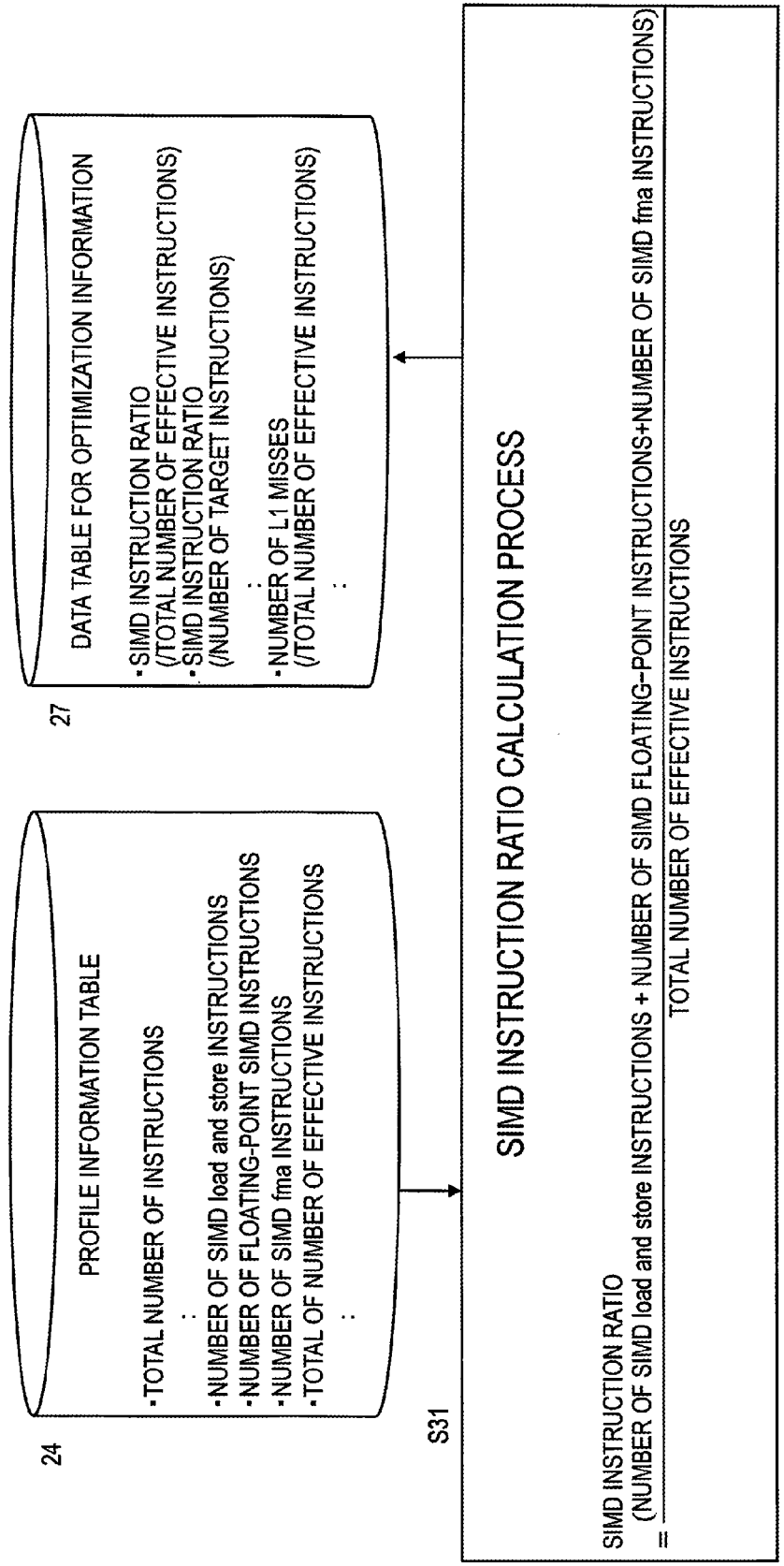

FIG. 10A

PROGRAM EXAMPLE IN WHICH IF STATEMENT IS PRESENT IN DO LOOP

```
do i=1,n1
   if  (p(i) > q) then
      a(i) = c0+b(i)*(c1+b(i)*
  &           (c2+b(i)*(c3+b(i)*c4)))
      endif
      enddo
```

PROGRAM EXAMPLE IN WHICH NO IF STATEMENT IS PRESENT IN DO LOOP

```
do i = 1 , n   (ex. n=10)
   b(i) = c0 + a(i)*(c1 + a(i)*(c2 + a(i)*(c3 + a(i)*
  &        (c4 + a(i)*(c5 + a(i)*(c6 + a(i)*(c7 + a(i)*
  &        (c8 + a(i)*c9))))))))
      enddo
```

31

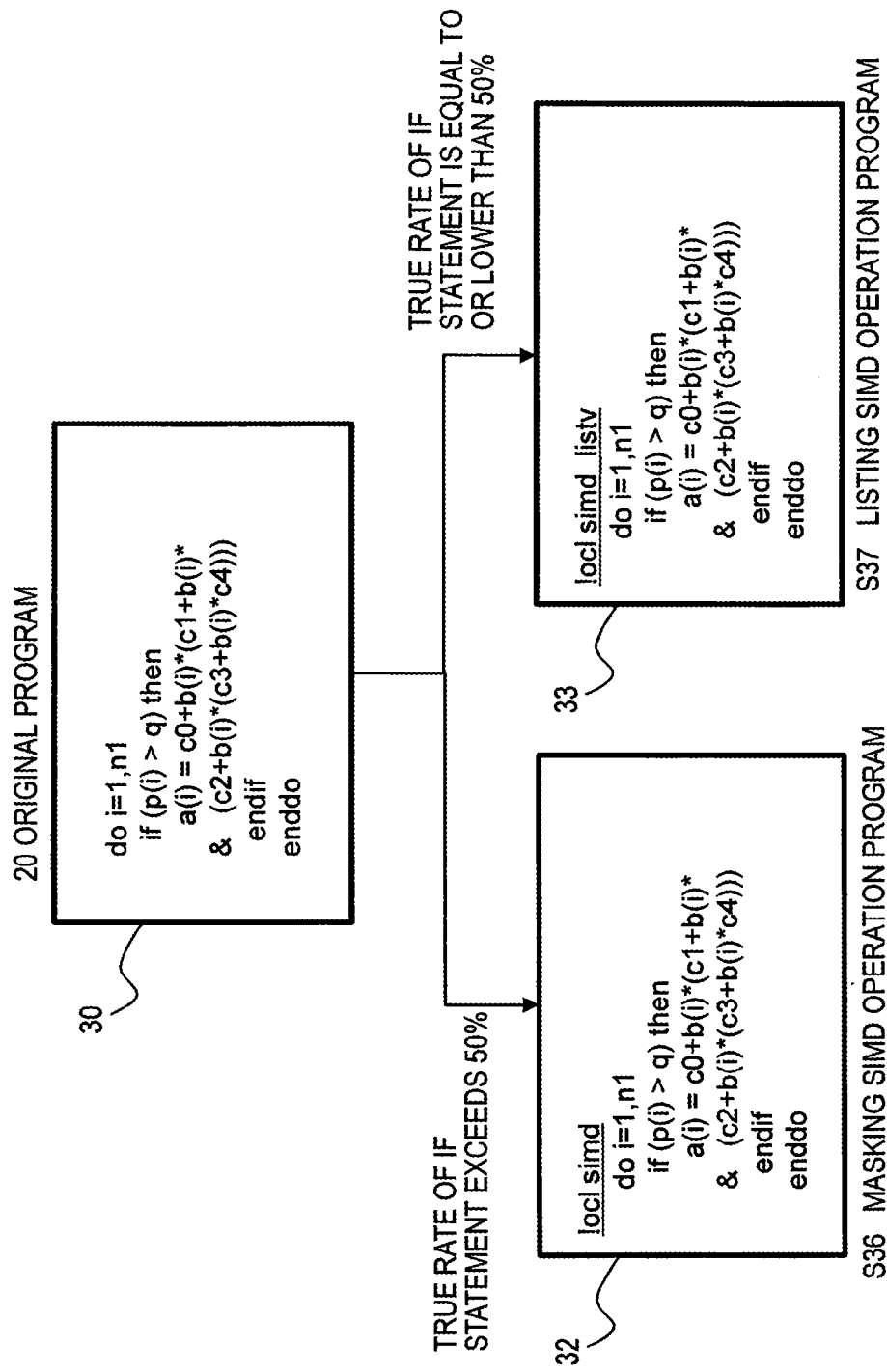

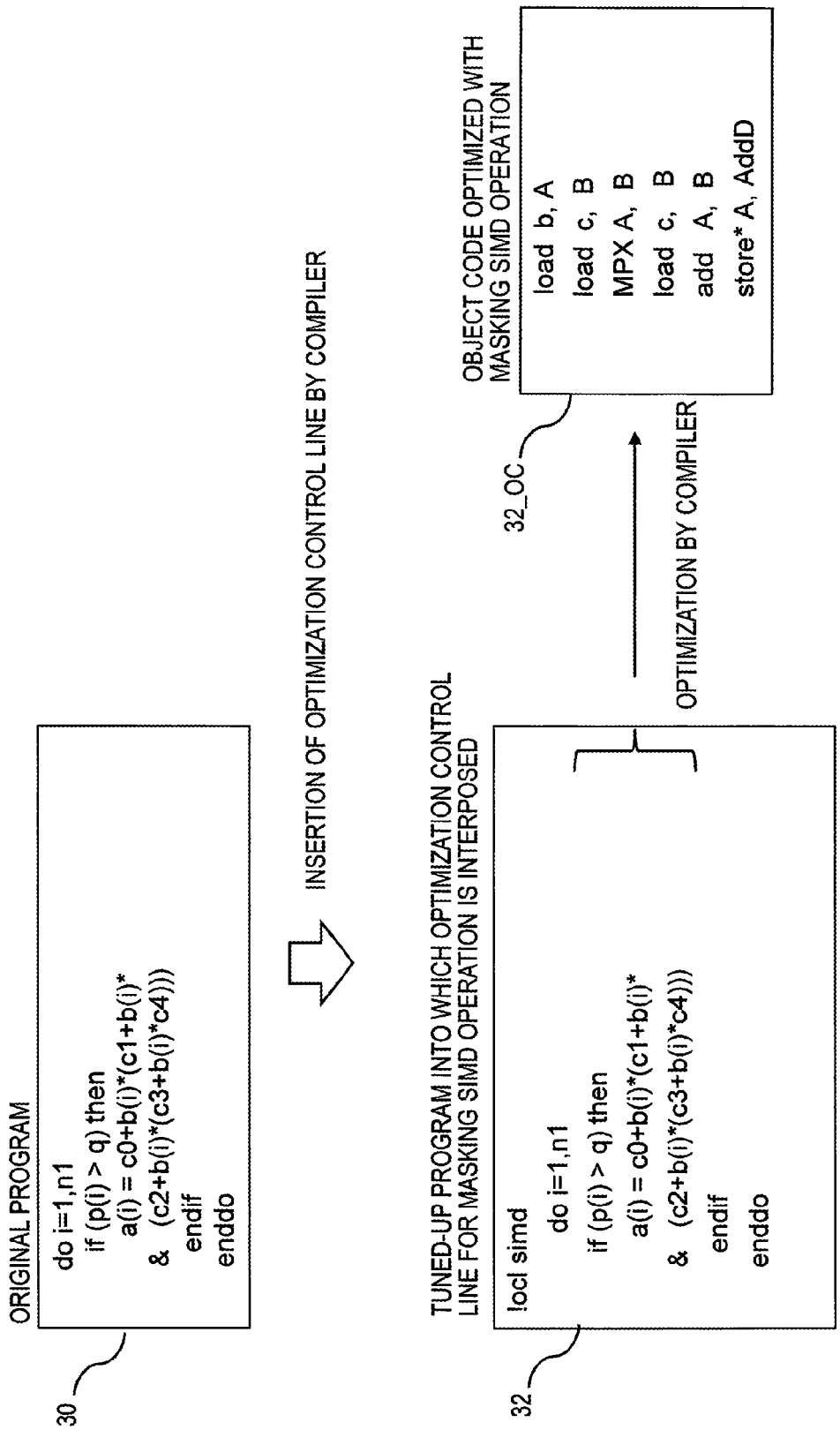

FIG. 14

| CYCLE | SIMD ARITHMETIC UNIT 1 | SIMD ARITHMETIC UNIT 2 |
|---|---|---|
| 1 | 1. Load, Load, MPX, Load, Add, Store* (True) | 2. Load, Load, MPX, Load, Add, Store* (False) |
| 2 | 3. Load, Load, MPX, Load, Add, Store* (True) | 4. Load, Load, MPX, Load, Add, Store* (False) |
| 3 | 5. Load, Load, MPX, Load, Add, Store* (True) | 6. Load, Load, MPX, Load, Add, Store* (True) |
| 4 | 7. Load, Load, MPX, Load, Add, Store* (True) | 8. Load, Load, MPX, Load, Add, Store* (True) |
| 5 | 9. Load, Load, MPX, Load, Add, Store* (True) | 10. Load, Load, MPX, Load, Add, Store* (True) |

Load, Load, MPX, Load, Add, Store* (True): STORE INSTRUCTION IS EXECUTED
Load, Load, MPX, Load, Add, Store* (False): STORE INSTRUCTION IS NOT EXECUTED

FIG. 16

| CYCLE | SIMD ARITHMETIC UNIT 1 | SIMD ARITHMETIC UNIT 2 |
|---|---|---|
| 1 | 1. Load, Load, MPX, Load, Add, Store | 3. Load, Load, MPX, Load, Add, Store |
| 2 | 5. Load, Load, MPX, Load, Add, Store | 7. Load, Load, MPX, Load, Add, Store |
| 3 | | |
| 4 | | |
| 5 | | |

Example: idx(1)=1, idx(2)=3, idx(3)=5, idx(4)=7

FIG. 24

```
PROGRAM NAME / FUNCTION NAME(OR SUBROUTINE NAME) / NUMBER OF LINE / INFORMATION ON OPTIMIZATION CONTROL LINE
Sample.f    / sub      / 108   / simd
Test.f      / calc     / 1097  / simd, nounroll, noswp
Main.f      / main     / 97    / simd_listv
. . .
```

PROGRAM OPTIMIZATION METHOD, PROGRAM OPTIMIZATION PROGRAM, AND PROGRAM OPTIMIZATION APPARATUS

CROSS-REFERENCE TO RELATED APPLICATION

This application is based upon and claims the benefit of priority of the prior Japanese Patent Application No. 2014-164671, filed on Aug. 13, 2014, the entire contents of which are incorporated herein by reference.

FIELD

The present invention relates to a program optimization method, program optimization program, and a program optimization apparatus.

BACKGROUND

A compiler analyzes an original program, performs optimization and coverts the optimized program into an object code that can be executed by a computer. However, the compiler executes optimization processes only under predetermined conditions and has difficulties performing the most ideal optimizations on various source programs individually.

Optimization of a program is described in, for example, Japanese Patent Application Laid-open No. 2000-35894, Japanese Patent Application Laid-open No. S63-632, Japanese Patent Application Laid-open No. 2010-218367, and Japanese Patent Application Laid-open No. H08-263298.

SUMMARY

Optimization of a program needs to be realized not only by improving an algorithm for the program but also by taking into account the hardware of a computer that executes the program. However, the optimization of the program is generally uniformly performed, regardless of the structure of the target program. Such uniformly implemented optimization may not always produce optimum results or may result in decreased efficiency, depending on the structure of the program or the hardware structure of a computer that executes the program.

One aspect of the embodiment is a program optimization method, executed by an arithmetic processing device, comprising:

collecting profile information including a runtime analysis result by causing a computer to execute an original program to be optimized;

calculating a calculation wait time based on the profile information; and generating a tuned-up program, when the calculation wait time is longer than a first threshold, by inserting an SIMD operation control line that performs an SIMD operation for an instruction in IF statement in the loop when an SIMD instruction ratio in the loop in the original program is lower than a second threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram depicting a configuration of a program optimization apparatus in the present embodiment.

FIG. 3 is a flowchart of an optimization process.

FIG. 4 is a diagram depicting an example of an executable binary code described in a source code.

FIG. 9 is a diagram illustrating an example of a calculation process for the SIMD instruction ratio.

FIGS. 10A and 10B illustrate a program example in which an IF statement is present in the loop and a program example in which no IF statement is present in the loop.

FIG. 11 is a diagram depicting an optimization control line for the masking SIMD operation and an optimization control line for the listing SIMD operation which are interposed in steps S36 and S37.

FIG. 13 is a diagram illustrating the optimization based on the masking SIMD operation.

FIG. 14 is a diagram illustrating an example of operations performed by the SIMD arithmetic units when the object code with the masking SIMD operation performed thereon is executed.

FIG. 16 is a diagram illustrating an example of operations performed by the SIMD arithmetic units when the CPU core executes the object code 32_OC in FIG. 15.

FIG. 24 is a diagram depicting an example of the optimization control line data.

DESCRIPTION OF EMBODIMENTS

Figure 1:
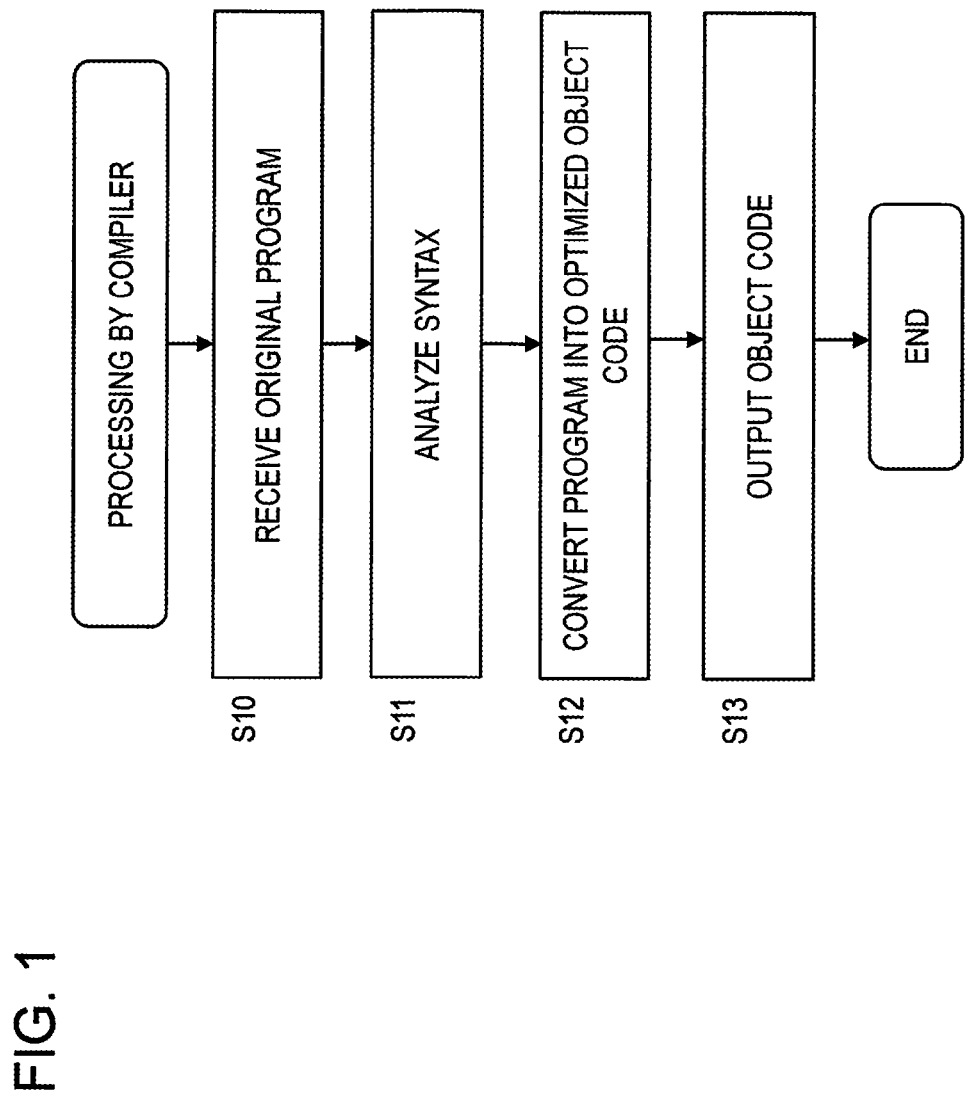
FIG. 1 is a flowchart depicting processing executed by a compiler.

FIG. 1 is a flowchart depicting processing executed by a compiler. The compiler receives a program of an original source code (S10), analyzes the syntax of the original program (S11), and converts the original program into a program of an object code optimized based on the results of the analysis (S12). Then, the compiler outputs the resultant program of the object code (S13).

A certain type of optimization executed by the compiler is based on the hardware of the computer that executes the converted program. For example, a CPU core of a CPU (Central Processing Unit) provided in an information processing apparatus such as a computer internally has a plurality of arithmetic units and performs an SIMD (Single Instruction Multiple Data) calculation in which the same processing is executed on a plurality of data items in parallel using a single instruction. Furthermore, the CPU core has a pipeline configuration, and expands consecutive instructions into a pipeline to process a plurality of instructions in parallel. Such SIMD arithmetic units are effectively utilized or the function to expand software into a pipeline is utilized to enable an increase in the efficiency of program execution.

Furthermore, the compiler performs unrolling expansion in which an instruction in a loop in the original program is expanded into a plurality of (n) instructions in the loop to reduce the number of loops down to one-nth. The unrolling expansion of the original program reduces the overhead of processing that increases consistently with the number of loops and facilitates SIMD calculations, thus enhancing the efficiency of executing the program.

The present embodiment optimizes the original program, by the above-described utilization of SIMD arithmetic units or of the pipeline expansion or unrolling expansion of software as described above.

First, several keywords herein will be described in brief. The original program is a program to be optimized. A tuned-up program is the original program into which an optimization control line has been interposed. Based on the optimization control line in the tuned-up program, the compiler executes an optimization process most suitable for the program and converts the program into a program of object code.

Profile information is various pieces of information obtained by executing the original program and includes hardware monitor information and runtime information. The hardware monitor information is floating-point instruction information, integer instruction information, SIMD instruction information, and the like carried out when the program is executed. A monitor circuit provided in the CPU that executes the program collects and outputs the information. The runtime information is the number of iterations of the loop in the program, the number of executions of an assignment expression, or the like, and can be collected by, for example, interposing, into the original program, an instruction to count such a number when the original program is executed.

A bottleneck is information indicative of a factor that hinders or determines the performance of the program and is calculated from the hardware monitor information acquired when the program is executed, in accordance with a predetermined calculation formula.

The optimization control line is a control command serving as a guideline for the optimization performed by the compiler when the compiler optimizes the program. An optimization apparatus in the present embodiment automatically determines the optimization control line based on the bottleneck and the profile information and interposes the determined optimization control line into the original program. A tuned-up program is generated by inserting the optimization control line into the original program. In compiling the tuned-up program, the compiler converts the program into an object code optimized in accordance with an instruction in the optimization control line.

FIG. 2 is a diagram depicting a configuration of a program optimization apparatus in the present embodiment. The program optimization apparatus has a CPU 10 that is a processor, a main memory 13, an I/O apparatus 14, a large-capacity memory 15 such as a hard disk, and a bus 16 that connects these components together. The CPU 10 has a CPU core 11 with a decoder, an arithmetic unit, a register, and the like, a primary cache memory L1, a secondary cache memory L2, and a monitor circuit 12 that acquires hardware monitor to information when the program is executed.

For example, when the computer executes an ecode (object code) into which the original program has been converted by the compiler, the monitor circuit 12 collects the hardware monitor information such as the total number of instructions executed, the number of floating-point load memory access waits, the number of integer load memory access waits, the number of I/O access waits, the number of integer load cache access waits, the total number of waits, the total number of effective instructions, the number of calculation waits, the number of store waits, the number of floating-point calculation waits, the number of L2 demand misses, the number of L2 prefetch misses, the number of L2 demand write-backs, the number of L2 prefetch write-backs, the number of SIMD load and store instructions, the number of SIMD floating-point instructions, and the number of SIMD fma instructions, and output the collected hardware monitor information to an external apparatus. The fma instruction is an instruction to execute a multiplication and an addition at a time.

Based on these pieces of hardware monitor information, an SIMD instruction ratio, a cache hit or miss ratio, a memory throughput, and the like are calculated as described below.

The monitor circuit 12 is a hardware circuit provided in a processor 10 in the computer that executes the executable binary code. The obtainable hardware monitor information depends on the processor.

The hard disk 15 in the program optimization apparatus in FIG. 2 stores the compiler that optimizes and converts an original program 20 or a tuned-up program 23 into an executable binary code (object code) 21. Furthermore, the hard disk 15 stores a library program which collects profile information obtained by executing the executable binary code (object code) generated by the compiler and which analyzes the characteristics of the program to generate optimization control line and interposition position information (intermediate data and optimization control line data), and a tool program that interposes the optimization control line into the original program to generate a tuned-up program. The compiler, the library program, and the tool program correspond to an optimization program 16 that optimizes the original program. The hard disk 15 also stores the original program 20, binary code 21, and optimization control line data (intermediate data) 22 relating to the optimization control line and the tuned-up program 23.

FIG. 3 is a flowchart of an optimization process. The program optimization apparatus in FIG. 2 carries out the optimization process in FIG. 3 by executing the compiler, library program, and tool program included in the optimization program 16. The optimization process is as follows.

S10: The compiler compiles the original program to generate an executable binary code 21. The executable binary code 21 incorporates a mechanism or statements executed by the computer to extract runtime information on the original program. The runtime information includes the number of executions of each statement line in the original program, the number of loop iterations, and the number of executions of an assignment expression. The runtime information is extracted in association with a program name, a function name, and a line number.

FIG. 4 is a diagram depicting an example of an executable binary code described in a source code. In this example, a statement "call STAR_COLLECTION" that allows collection of the runtime information and the hardware monitor information and a statement "call STOP_COLLECTION" for ending the collection are interposed into a subroutine "sub".

S11: The computer executes the executable binary code 21 to collect the profile information on the original program having the runtime information and the hardware monitor information. The hardware monitor information is collected and output by the monitor circuit 12 provided in the processor in the computer as described above.

S12: Then, the computer executes the library program to perform calculations for bottleneck candidates for the original program based on the collected profile information. The bottleneck of the original program includes a long calculation wait time, a long load wait time in the main memory, a long store to wait time in the main memory, a long access wait time in the cache memory, and a high throughput of the main memory. In step S12, calculations for these bottleneck candidates are performed to analyze a bottleneck to be corrected by optimization.

S13: When the bottleneck to be corrected is detected, the computer executes the library program to analyze optimizations that correct the bottleneck to determine which of the optimizations is to be executed. A factor that hinders improvement of performance varies with the bottleneck, and thus, optimization analysis suitable for the bottleneck to be corrected needs to be performed.

S14: Then, the computer executes the library program to generate an optimization control line corresponding to the analysis results for optimization and acquires information such as the name of a program, a function, or a subroutine and the number of a line into which the optimization control line is to be interposed.

S15: Moreover, the computer executes the library program to generate and output optimization control line data 22 having the optimization control line and information on the program into which the optimization control line is to be interposed and information on the location of the interposition. The optimization control line data 22 includes the optimization control line and interposition location information such as the name of the program and the number of the line into which the optimization control line is to be interposed; the optimization control line and the pieces of information are arranged in a predetermined format.

S16: Finally, the computer executes the tool program to insert the optimization control line into the original program based on the optimization control line data 22 and output the tuned-up program 23 that is an optimized program. Subsequently, the computer executes the compiler to optimize the tuned-up program 23 in accordance with the optimization control line to generate an object code. In other words, the optimization control line is a type of command that indicates to the compiler which of various optimization to processes provided in the compiler is to be executed. As depicted in FIG. 1, the compiler input the tuned-up program in the step S10.

As described above, according to the present embodiment, the program optimization apparatus in FIG. 2 executes an optimization process in FIG. 3 to enable a reduction in a work time for interposition of the optimization control line which is conventionally performed by a user over an enormous time. Furthermore, even when the runtime information obtained when the original program is executed is variable, and thus, even when a plurality of loops in the original program has different loop characteristics, the optimization control line suitable for each loop can be interposed.

Figure 5:
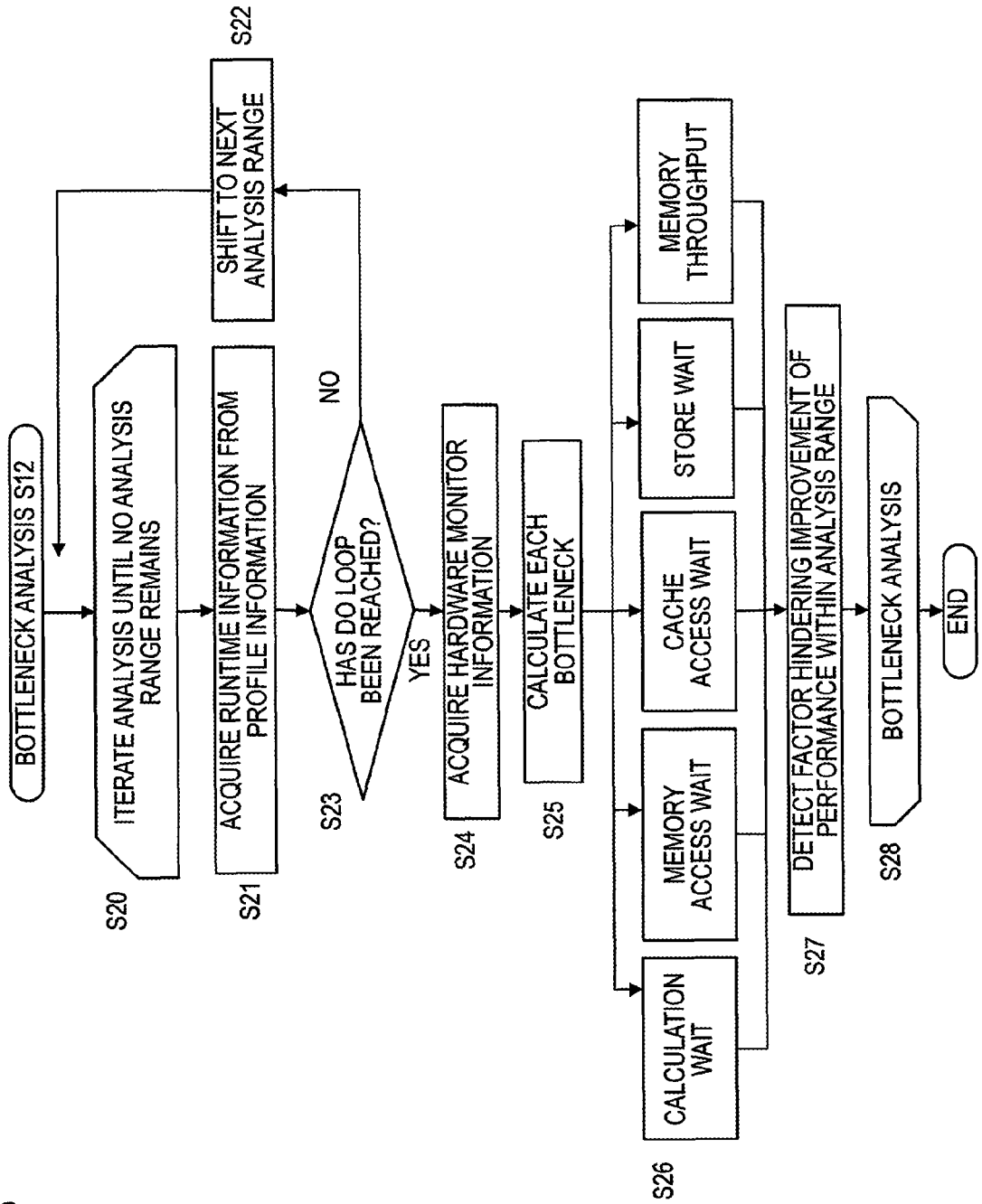
FIG. 5 is a flowchart of bottleneck analysis S12 in FIG. 3.

FIG. 5 is a flowchart of bottleneck analysis S12 in FIG. 3. The computer in the program optimization apparatus in FIG. 2 executes the library program to calculate bottleneck candidates for the original program. The computer iterates processing from S20 to S28 until processing of an analysis range in the original program ends.

S21: The computer executes the library program to determine whether or not a loop structure in the original program has been reached, while acquiring the runtime information from the profile information (S23 and S22). Then, the computer executes the library program to acquire the hardware monitor information in the loop (S24) each time the loop structure in the original program is reached (S23, YES) and calculate, for example, five bottlenecks depicted in FIG. 5 and which serve as candidates (S25, S26). In general, bottlenecks occur in the loop structure, and thus, the program optimization apparatus in the present embodiment sets the loop in the original program to be the analysis range, and analyzes the bottlenecks for each loop to generate an optimization control line to be interposed into the loop.

Candidates for the bottleneck include a calculation wait time, a load (load memory access) wait time in the main memory, an access wait time in the cache memory, a store (store memory access) wait time in the main memory, and a memory throughput.

The calculation wait time is a wait time from an entry into a to reservation section of the arithmetic unit after an instruction is decoded and performing a calculation is determined, until starting of actual calculation in the processor. The calculation wait time includes a floating-point calculation wait time and an integer calculation wait time.

The load memory access time is a time for which an execution of a load instruction to the memory is waited, and includes a floating-point load memory access wait time and an integer load memory access wait time.

The cache access wait time is a time for which an execution of a load access instruction to the cache memory is waited, and includes a floating-point load cache access wait time and an integer load cache access wait time.

The store memory access wait time is a time for which an execution of a store instruction to the memory is waited, and includes a floating-point store memory access wait time and an integer store memory access wait time.

The memory throughput is a value resulting from division of total data capacity of memory access by a time needed to execute a total number of instructions. The memory throughput is an indicator indicative of the usage efficiency of the main memory. In general, if the memory throughput is high enough to exceed a threshold, the efficiency of the program often fails to be improved even when other bottlenecks are corrected. If the memory throughput is low and equal to or lower than the threshold, the efficiency of the program is often improved when other bottlenecks are corrected. An improvement measure taken when the memory throughput exceeds the threshold is, for example, improvement of the hardware such as an increase in the memory capacity in the computer.

The computer determines calculated values for the above-described bottlenecks for each loop that is the analysis range and stores the calculated values in the memory or the hard disk.

The computer then executes the library program to perform optimization analysis on the bottlenecks to be corrected for each loop that is the analysis range, based on the calculated value for each bottleneck, thus detecting a factor which hinders performance improvement and which corresponds to each bottleneck (S27).

Figure 6:
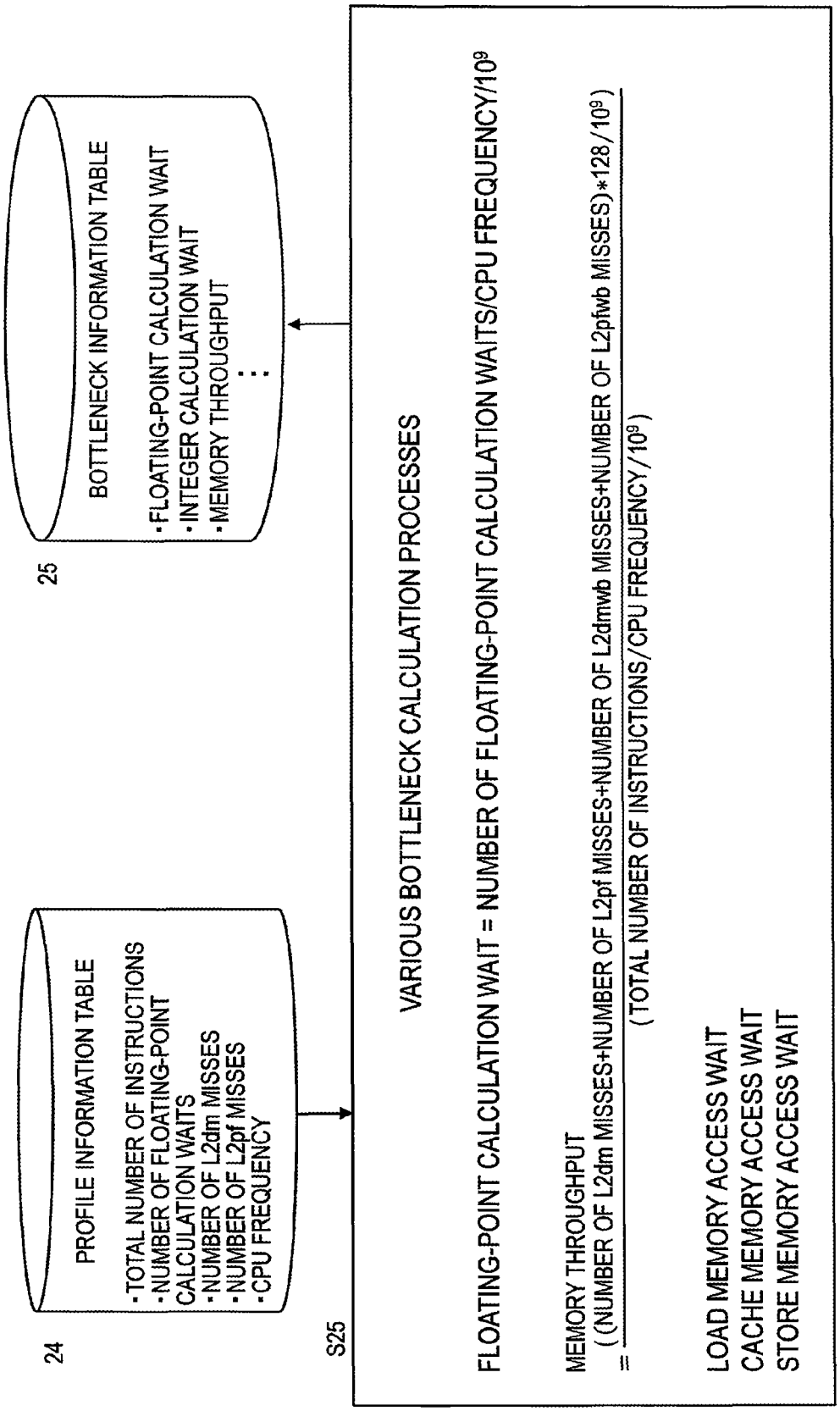
FIG. 6 and FIG. 7 are diagrams illustrating calculation examples for the bottlenecks.
Figure 7:
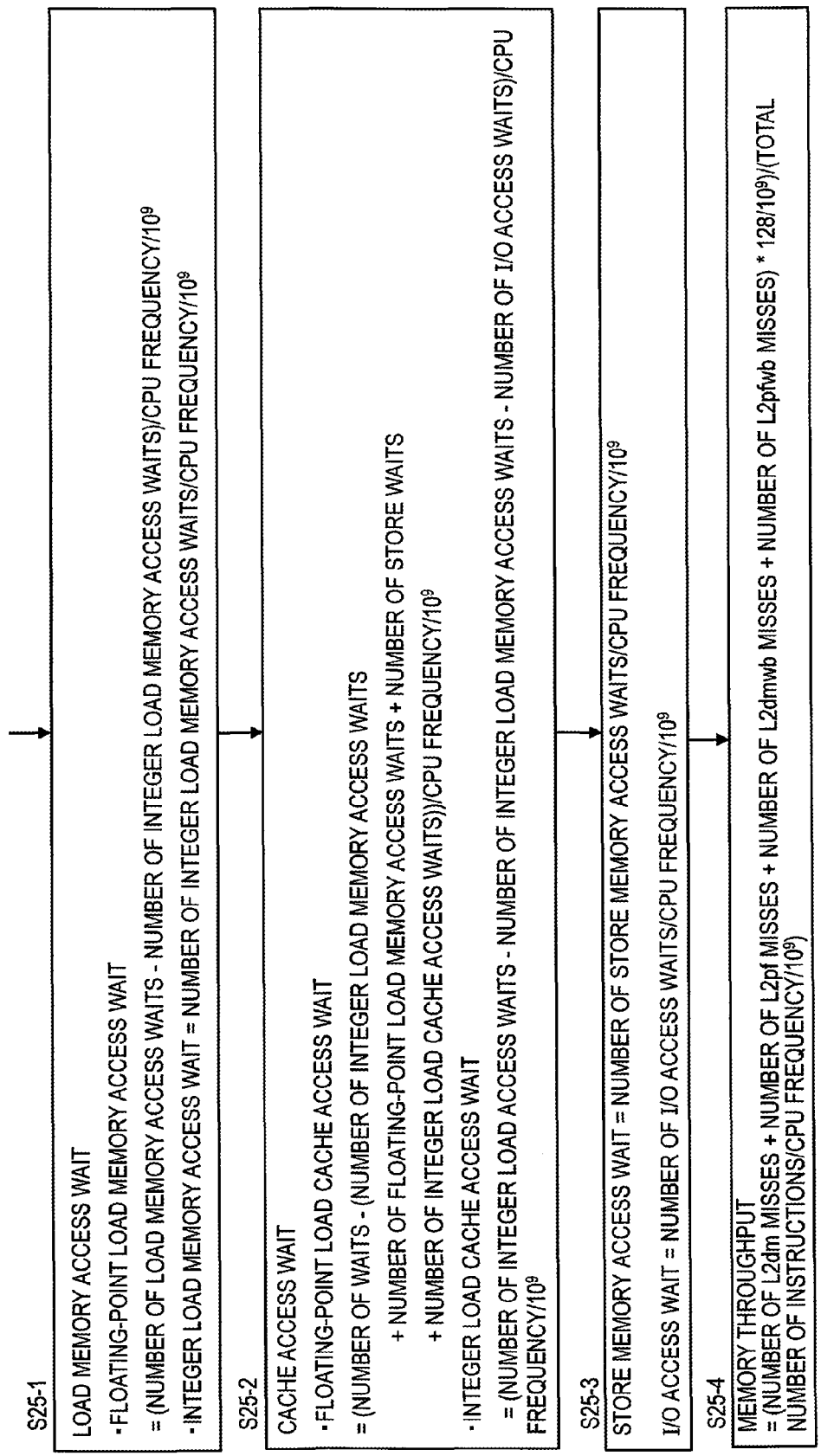

FIG. 6 and FIG. 7 are diagrams illustrating calculation examples for the bottlenecks. FIG. 6 depicts a profile information table 24 stored in the memory or the hard disk, a bottleneck calculation process example S25, and a profile information table 25 that stores values determined by bottleneck calculations. FIG. 6 depicts the floating-point calculation wait time and the memory throughput as an example of the bottleneck calculation process S25.

Furthermore, FIG. 7 illustrates calculation formulae for load memory access wait (floating-point load memory access wait and integer load memory access wait) (S25-1), cache access wait (floating-point cache access wait and integer load cache access wait) (S25-2), store memory access wait, I/O access wait (S25-3), and main memory (S25-4).

As depicted in S25 in FIG. 6, the floating-point calculation wait (time) is the total time for the number of floating-point calculation waits collected by the hardware monitor circuit, and $10^9$ corresponds to gigahertz of CPU frequency. Furthermore, the memory throughput is determined by dividing the total capacity for memory accesses by the total number of instructions. The total capacity for memory accesses is obtained by multiplying, by the capacity of one cache line in the cache memory (128 bytes), the sum of the number of cache misses resulting from access requests (or demands) (demand: dm) to an L2 cache memory, the number of cache misses resulting from prefetch requests (prefetch: pf) to the L2 cache memory, the number of writebacks (write back: wb) at the time of access requests to the L2 cache memory, and the number of writebacks at the time of prefetch requests to the L2 cache memory.

The calculation formulae for various waits illustrated in FIG. 7 are as depicted in the figure. Furthermore, an expression for determining the memory throughput is the same as the expression in FIG. 6.

[Analysis of Optimization in a Case where the Calculation Wait Time Exceeds a Threshold]

Figure 8:
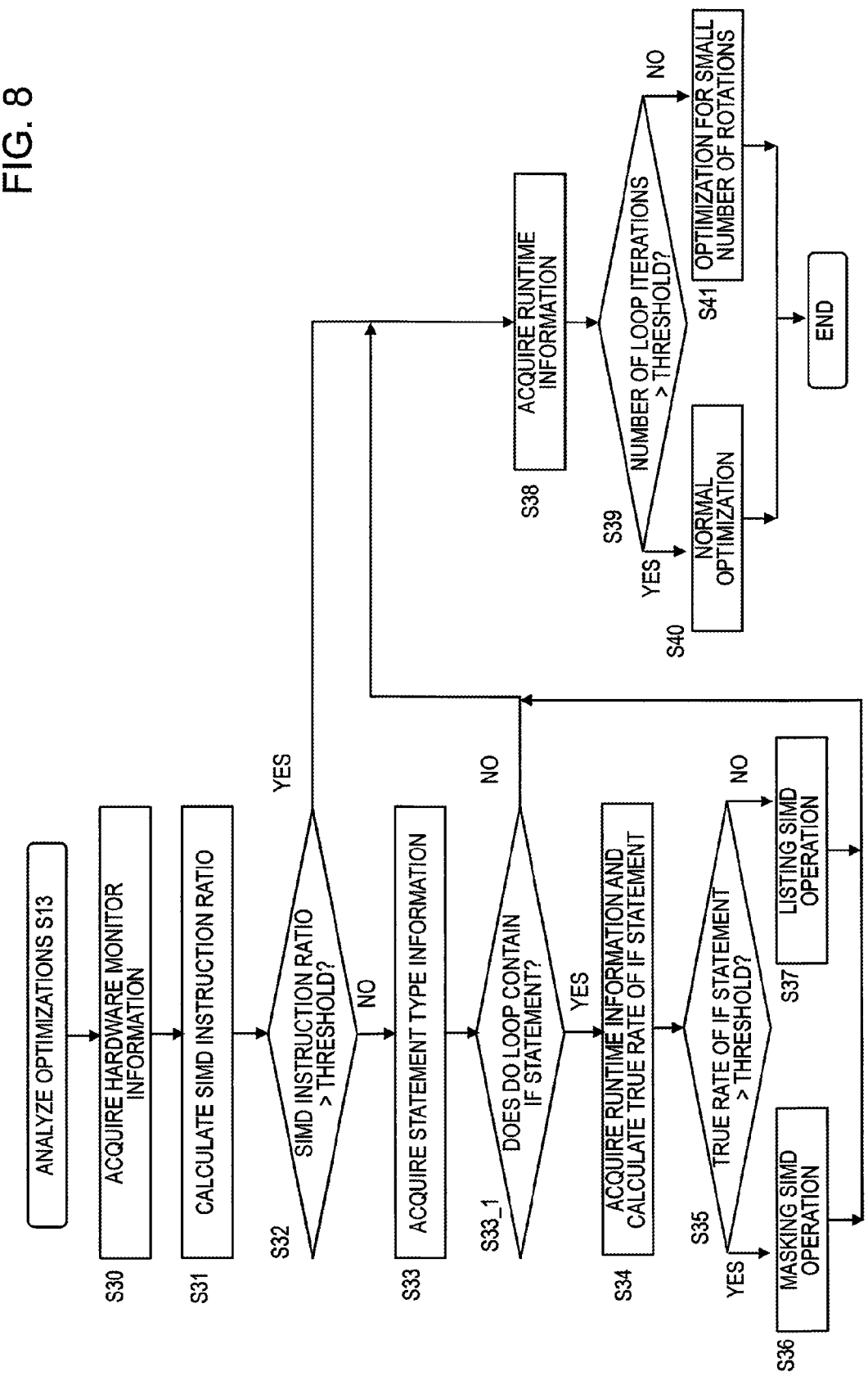
FIG. 8 is a flowchart of an optimization analysis step S13 in FIG. 3.

FIG. 8 is a flowchart of an optimization analysis step S13 in FIG. 3. The analysis of the optimization illustrated in FIG. 8 indicates an optimization analysis process executed when, in FIG. 5, a calculation wait time that is one of the bottlenecks exceeds a threshold, so that the bottleneck of the calculation wait is determined to be corrected. That is, the analysis of the optimization in FIG. 8 is a process of analytically checking which optimization control line is to be interposed and where the optimization control line is to be interposed in order to improve the calculation wait. Furthermore, the optimization analysis step in FIG. 8 is executed for each loop that is the analysis range.

S30 and S31: The computer executes the library program to acquire the already acquired and stored hardware monitor information. The computer then calculates the SIMD instruction ratio indicating whether or not an SIMD arithmetic unit has processed instructions on a plurality of data items in parallel. The SIMD instruction ratio is the SIMD instruction ratio in the loop that is the analysis unit.

FIG. 9 is a diagram illustrating an example of a calculation process for the SIMD instruction ratio. The computer calculates the SIMD instruction ratio from the data in the profile information table 24 containing hardware monitor information in accordance with the illustrated calculation formula, and stores the calculated SIMD instruction ratio in a profile information table 27 for optimization information.

In accordance with the calculation formula, the SIMD instruction ratio is determined by dividing, by the total number of effective instructions, the sum of the number of SIMD load and store instructions, the number of SIMD floating-point instructions, and the number of SIMD fma instructions. An fma (Fused Multiply and Add) instruction is an instruction to perform a multiplication and an addition at a time. The SIMD instruction ratio is calculated based on the sum of the number of SIMD load and store instructions, the number of SIMD floating-point instructions, and the number of SIMD fma instructions, and the total number of effective instructions, which are collected by the monitor circuit as the hardware monitor information. See the profile information table 27 including the hardware monitor information.

For the calculation formula in FIG. 9, it is assumed that the SIMD arithmetic unit in the CPU core in the CPU in FIG. 2 has an arithmetic unit that processes a load instruction and a store instruction in parallel, an arithmetic unit that processes floating-point calculation instructions in parallel, and an arithmetic unit that processes fma instructions in parallel. Thus, the calculation formula for the SIMD instruction ratio varies depending on the configuration of the SIMD arithmetic unit in the CPU core in the computer that executes the program.

S32: When the SIMD instruction ratio does not exceed a predetermined threshold (S32, NO), the computer determines whether or not to be able to add an optimization control line that allows an SIMD operation to be performed on an instruction in an IF statement (S33 to S37). In this case, it is assumed that, when, in steps S10 and S11 in FIG. 3, the computer executes the compiler to compile the original program 20 and executes the resultant executable binary code 21 to collect the profile information, no SIMD operation has been performed on the instruction in the IF statement. In general, the instruction in the IF statement is executed when a condition for the IF statement is met, and thus, performing an SIMD operation for parallel computations may conversely reduce efficiency. Therefore, the compiler may perform optimization so as to avoid performing an SIMD operation on the instruction in the IF statement.

When the SIMD instruction ratio exceeds the threshold (S32, YES), the computer does not check whether to be able to perform an SIMD operation on the instruction in the IF statement.

Furthermore, regardless of whether or not the SIMD instruction ratio exceeds the threshold, the computer analyzes an optimization process compatible with the number of iterations of the loop structure to find out an optimization control line to be interposed (S38 to S41).

S33 and S33_1: The computer executes the library program to acquire statement type information in the loop that is the analysis range of the original program to check whether or not any IF statement is present in the loop. If any IF statement is present in the loop, the computer executes steps S34 to S37 to determine an optimization control statement indicating an SIMD operation suitable for the IF statement.

FIGS. 10A and 10B illustrate a program example in which an IF statement is present in the loop and a program example in which no IF statement is present in the loop. FIG. 10A illustrates a program 30 in which an IF statement is present in a DO loop and in which, when a loop control variable (i) ranging from 1 to n meets the condition in the IF statement, an illustrated operation instruction is iteratively executed. FIG. 10B illustrates a program 31 in which no IF statement is present in a DO loop and in which an illustrated operation instruction is iteratively executed while the loop control variable (i) ranges from 1 to n.

S34 and S35: The computer executes the library program to acquire runtime information on the IF statement to calculate the true rate of the IF statement. The computer then checks whether or not the true rate of the IF statement exceeds a predetermined threshold, for example, 50%.

S36 and S37: The computer executes the library program to select an SIMD scheme depending on whether the true rate of the IF statement is high or low. That is, the computer determines a control line indicating a masking SIMD operation to be the optimization control line when the true rate of the IF statement exceeds the threshold (S36) and determines a control line indicating a listing SIMD operation to be the optimization control line when the true rate of the IF statement is equal to or lower than the threshold (S37).

FIG. 11 is a diagram depicting an optimization control line for the masking SIMD operation and an optimization control line for the listing SIMD operation which are interposed in steps S36 and S37. The original program 20 is the same as the program 30 illustrated in FIG. 10A. When the rate at which the condition in the IF statement, P(i)>q, is true exceeds 50% of the threshold, the computer determines to generate a program 32 in which an underlined optimization control line "!ocl simd" that controls the masking SIMD operation is interposed before the DO statement (S36). Furthermore, when the true rate is equal to or lower than 50%, the computer determines to generate a program 33 in which an underlined optimization control line "!ocl simd_listv" that controls the listing SIMD operation is interposed before the DO statement (S37).

As seen back in FIG. 8, both when the SIMD instruction ratio exceeds a predetermined threshold (S32, YES) and when the SIMD instruction ratio is equal to or lower than the predetermined threshold (S32, NO), the computer executes the library program to acquire the runtime information on the loop (S38). Then, when the number of iterations of the loop exceeds a predetermined threshold (S39, YES), the computer selects an optimization control line that optimizes a normal loop structure. When the number of iterations of the loop is equal to or smaller than the predetermined threshold (S39, NO), the computer selects an optimization control line that optimizes a loop structure with a small number of rotations.

In the optimization of a normal loop structure that is iteratively performed a sufficient number of times (S40), the compiler performs unrolling expansion on the DO loop to convert the DO loop into an object code on which an SIMD operation can be easily performed. The CPU core that executes the object code performs software pipelining to increase the execution efficiency for instructions, thereby reducing the number of execution cycles for the instructions. On the other hand, in the optimization of the loop structure with a small number of rotations (S41), the compiler does not generate, in the object code, a process loop with software pipelining or a process loop with unrolling expansion that is not utilized when number of iterations is excessively small, thereby reducing overhead involved in selection of a plurality of loops.

The masking SIMD operation and the listing SIMD operation will be described, and moreover, an example of optimization of a normal loop structure and an example of optimization of a loop with small number of rotations will be described.

[Masking SIMD Operation and Listing SIMD Operation]

The masking SIMD operation and the listing SIMD operation will be described in brief. First, a configuration example of a CPU core in the computer that executes the tuned-up program will be described.

Figure 12:
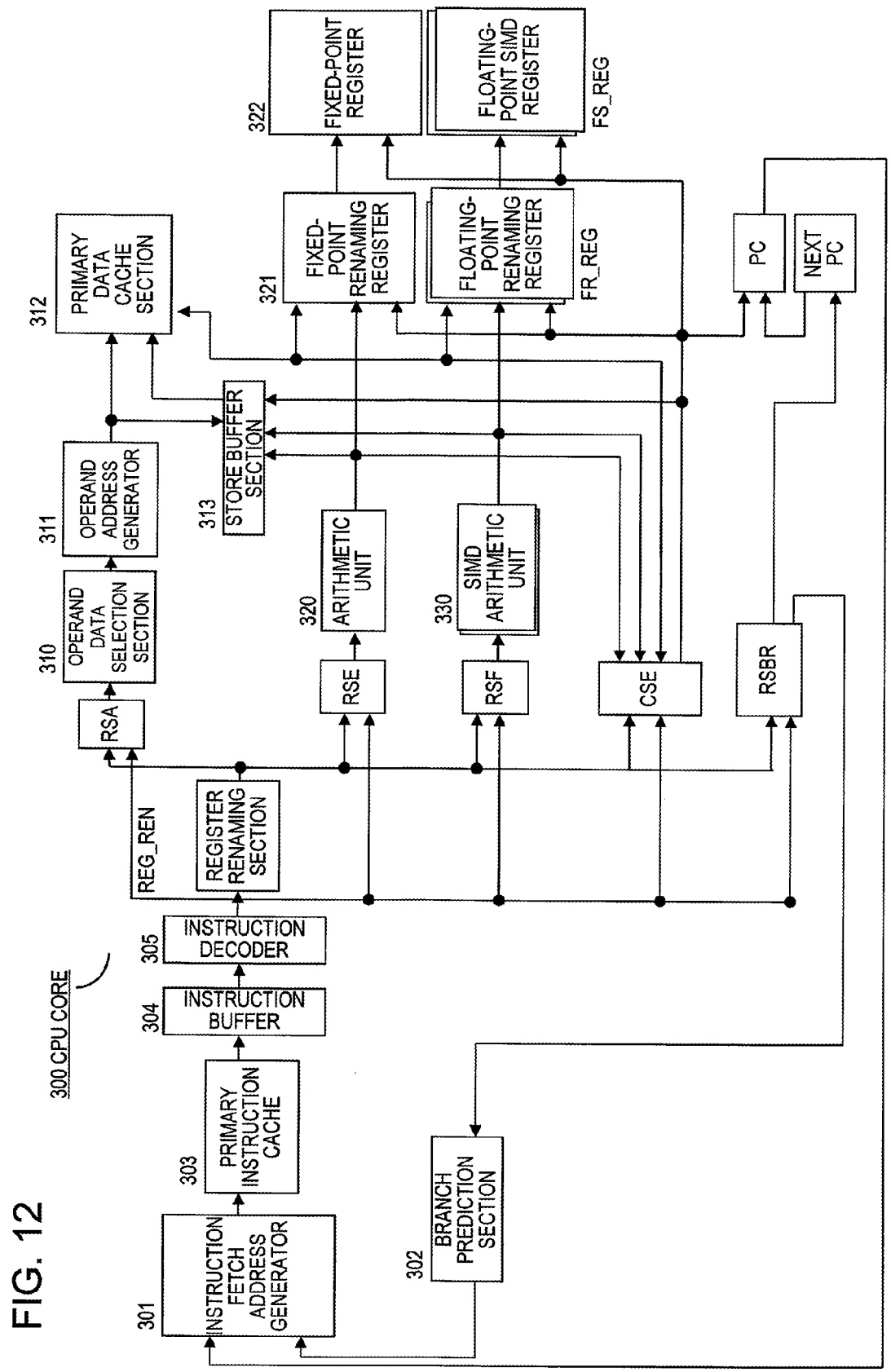
FIG. 12 is a diagram depicting a configuration example of a CPU core (arithmetic processing section).

FIG. 12 is a diagram depicting a configuration example of a CPU core (arithmetic processing circuit section). A CPU core 300 in FIG. 12 can perform SIMD processing according to an SIMD instruction of carrying out floating-point calculation, floating-point loading or floating-point storing on a plurality of data items. Furthermore, the CPU core 300 can execute a process according to a non-SIMD instruction to carry out on one data.

The CPU core 300 in FIG. 12 has an instruction fetch address generator 301 that selects a program counter PC or a branch destination address predicted by a branch prediction mechanism, a branch prediction section 302 that performs branch prediction on a branch instruction, a primary instruction cache 303 in which instructions are stored, an instruction buffer 304 in which instructions read from the primary instruction cache 303 are temporarily stored, and an instruction decoder 305 that decodes instructions. The instruction decoder 305 generates a control signal corresponding to the instruction and assigns a renaming register to a storage destination register specified in the instruction as described below.

The CPU core 300 further has a register renaming section REG_REN that stores a correspondence relation with the renaming register assigned to the storage destination register, a reservation station for address generate RSA, a reservation station for execute RSE, a reservation station for floating RSF, a reservation station for branch RSBR, and a commit stack entry CSE.

The reservation stations RS are queues for instructions issued by the instruction decoder 305 and provided in association with execution units that execute instructions. In particular, reservation station for execute RSE and the reservation station for floating RSF issue instructions out of order, in other words, issue instructions to the corresponding arithmetic units in an order in which input data and the arithmetic unit for the instruction have been set up earlier. On the other hand, the commit stack entry CSE determines whether, for all entries of instructions, the instruction is complete and completes the instructions in order which have been started out of order.

The CPU core 300 has an operand data selection section 310, an operand address generator 311, a primary data cache section 312, and a store buffer section 313. Furthermore, the CPU core 300 has an arithmetic unit 320 that executes a fixed-point calculation, an SIMD arithmetic unit 330 that executes a floating-point calculation, a fixed-point renaming register 321, a floating-point renaming register FR_REG, a fixed-point register 322, and a floating-point SIMD register FS_REG, and the program counter PC.

The instruction fetch address generator 301 selects an instruction address based on a count value in the program counter PC or information from the branch prediction section 302, and issues an instruction fetch request to the primary instruction cache 303. The branch prediction section 302 performs branch prediction based on the entries in the reservation station for branch RSBR. The primary instruction cache 303 stores instructions read in accordance with the instruction fetch request in the instruction buffer 304. Then, the instructions are fed from the instruction buffer 304 to the instruction decoder 305 in an order of the instructions specified by the program, that is, in order. The instruction decoder 305 decodes the instructions fed from the instruction buffer 304 in order.

The instruction decoder 305 creates an appropriate entry for any of the four reservation stations RSA, RSE, RSF, or RSBR in accordance with the type of the decoded instruction. At the same time, the instruction decoder 305 creates entries corresponding to all the decoded instructions for the commit stack entry CSE. The instruction decoder 305 also assigns a register in the renaming registers to an architecture register specified in the instruction.

When an entry is created for the reservation station RSA, RSE, or RSF, the register renaming section REG_REN stores the address of the renaming register assigned to the architecture register specified in the instruction. The correspondence relation between the specified architecture register and the assigned renaming register is registered in a renaming map in the register renaming section. The CPU core has the fixed-point register 322 and the floating-point SIMD register FS_REG as the architecture registers. One of these registers is specified in the instruction as a storage register in which the result of an arithmetic process is stored. The CPU core also has the floating-point renaming register 321 and the floating-point renaming register FR_REG as the renaming registers.

When the fixed-point register 322 is used as the storage destination register, the instruction decoder 305 assigns the address of the floating-point renaming register 321 as the renaming register. Furthermore, when the floating-point SIMD register FS_REG is used as the storage destination register, the instruction decoder 305 assigns the address of the floating-point renaming register FR_REG as the renaming register. The address of the renaming register assigned to the address of the above-described storage destination register is output, as a correspondence relation, to the reservation station RSA, RSE, or RSF and the commit stack entry CSE, which correspond to the instruction.

Each of the reservation stations RSA, RSE, and RSF sequentially outputs those of the held entries which serve as needed resources, for example, set up data and arithmetic units, and allows a block such as the succeeding arithmetic unit or the like to execute processing corresponding to respective entries. Thus, the instructions start to be executed out of order, and the results of processing of the instructions are temporarily stored in the fixed-point renaming register 321 or the floating-point renaming register FR_REG.

For example, entries corresponding to a floating-point calculation instruction are stored in the reservation station for floating RSF. Based on entries from the reservation station for floating RSF, the arithmetic unit 330 selects input data to be calculated and execute a floating-point calculation. When the floating-point calculation instruction is executed, the result of the calculation by the SIMD arithmetic unit 330 is temporarily stored in the floating-point renaming register FR_REG.

Furthermore, when a floating-point store instruction is executed, the SIMD arithmetic unit 330 outputs calculated data to the store buffer section 313. Then, the store buffer section 313 specifies an operand address output by the operand address generator 311, and writes the data output by the SIMD arithmetic unit 330 to the primary data cache section 312.

The commit stack entry CSE holds entries corresponding to all the instructions decoded by the instruction decoder 305, manages an execution status corresponding to each of the entries, and completes the instructions in order. For example, upon determining that the result of processing corresponding to the next entry to be completed is stored in the fixed-point renaming register 321 or the floating-point renaming register FR_REG and that the preceding instruction has been completed, the commit stack entry CSE allows the data stored in the renaming register to be output to the fixed-point register 322 or the floating-point SIMD register FS_REG. Then, the instructions executed on an out-of-order basis in each reservation station are complete in order.

The SIMD arithmetic unit 330 has a plurality of arithmetic units. Correspondingly, the floating-point renaming register FR_REG has a plurality of registers, and the floating-point SIMD register FS_REG has a plurality of registers. For example, when 4-SIMD processing which allows four sets of data to be processed in parallel using a single instruction is required, the SIMD arithmetic unit 330 has four arithmetic units.

The floating-point SIMD register FS_REG has the same number of registers as the number of the arithmetic units in the SIMD arithmetic unit. Similarly, the floating-point renaming register FR_REG has the same number of registers as the number of the arithmetic units in the SIMD arithmetic unit.

In FIG. 12, a plurality of fixed-point arithmetic units each including the arithmetic unit 320 that executes integer calculations, the fixed-point register 322, and the fixed-point renaming register 321 may be provided so as to allow SIMD processing to be dealt with. However, the configuration in FIG. 12 allows SIMD processing to be carried out only for floating-point processing.

The reservation station for floating RSF, the SIMD arithmetic unit 330, the floating-point SIMD register FS_REG, and the floating-point renaming register FR_REG, which provide a floating-point calculation unit in FIG. 12, process an SIMD instruction and non-SIMD instruction as described below. For an SIMD instruction, the plurality of arithmetic units in the SIMD arithmetic unit 330 executes processing in parallel and temporarily stores the results of the processing in the floating-point renaming registers FR_REG assigned to the respective arithmetic units. Then, when the commit stack entry CSE detects that the preceding instruction and the current instruction are complete, the processing results temporarily stored in the registers in the floating-point renaming register FR_REG are stored in the plurality of registers in the floating-point SIMD register FS_REG.

On the other hand, for a non-SIMD instruction, the results of processing in the arithmetic units are temporarily stored in the floating-point renaming registers FR_REG. Then, when the commit stack entry CSE detects the above-described instruction completion, the processing results temporarily stored in the registers in the floating-point renaming register FR_REG are stored in the plurality of registers in the floating-point SIMD register FS_REG.

[Masking SIMD Operation]

Now, optimization for the masking SIMD operation will be described. In the original program 30 in FIG. 11, an IF statement is included in the DO loop, and a calculation instruction is executed when a conditional expression in the IF statement is true. An example of such calculation instruction includes three statements specifying as follows: for example, for an addition operation, a first numerical value and a second numerical value are loaded from the memory to two registers, the first and second numerical values in the respective registers are added together with the result stored in another register, and the addition result in the register is stored in the memory. Thus, an addition instruction in a source code is converted into an object code in which the addition instruction is decomposed into a load instruction, an addition instruction, and a store instruction, and the object code is executed by the CPU. By carrying out the decomposed instructions, the computer first executes the load instruction for the above-described numerical values to be added together, then performs the addition operation using the plurality of SIMD arithmetic units when the load instruction is complete, and finally performs the store instruction of storing the addition result in the memory.

Thus, in general, in performing an SIMD operation on a calculation instruction in the IF statement, the compiler performs the following optimization: regardless of whether the condition in the IF statement is true or false, the SIMD arithmetic units execute all the calculation instructions in the IF statement that are consecutively executed by the DO loop, and the final store instruction is executed only when the condition in the IF statement is true and is not executed when condition is false. Such an SIMD operation is referred to as the masking SIMD operation. In other words, when the condition in the IF statement is false, the final store instruction is masked so as not to be executed. Performing such a masking SIMD operation enables the plurality of consecutive calculation instructions in the DO loop to be processed in parallel using the plurality of SIMD arithmetic units, allowing a calculation speed to be improved.

However, when the masking SIMD operation is performed, if the true rate at which the condition in the IF statement is true is low, the calculation result is likely to be discarded, conversely reducing the efficiency. In other words, an increase in efficiency due to the SIMD operation is overcome by a decrease in efficiency due to execution of useless calculations.

FIG. 13 is a diagram illustrating the optimization based on the masking SIMD operation. Upon executing the library program to detect that the true rate of the IF statement in the DO loop in the original program 30 exceeds 50%, the computer determines to interpose "!ocl simd" indicating the masking SIMD operation before the DO loop, as an optimization control line. As a result, the tuned-up program 32 with the optimization control line"!ocl simd" for the masking SIMD operation interposed before the DO loop is generated. The generation of the tuned-up program is performed by the computer executing the tool program as described below.

Then, the computer executes the compiler to optimize the tuned-up program 32 in accordance with the optimization control line to generate an object code 32_OC that enables the masking SIMD operation. The object code 32_OC depicted in FIG. 13 is described in a quasi assembler language to facilitate understanding. As indicated by the object code 32_OC, a calculation instruction in the IF statement is converted into a plurality of load instructions load, a multiplication instructions MPX, an addition instruction add, and a store instruction store*. Then, the store instruction store* is an instruction that is executed only when the condition in the IF statement is true and is not executed when the condition in the IF statement is false. The store instruction "store*" is a store instruction different from a normal store instruction "store". For the normal store instruction "store", a specified value is stored in the memory regardless of whether the condition in the IF statement is true or false. Thus, when the compiler converts calculation instructions in a source program into an object code, the masking SIMD operation is enabled by adopting the special store instruction "store*" as the final store instruction in the group of calculation instructions in the object code.

Upon executing the object code 32_OC into which the tuned-up program 32 has been converted, the CPU core in the processor executes the calculation instructions in the IF statement which are iterated in the DO loop, in the plurality of SIMD arithmetic units in parallel, regardless of whether the condition in the IF statement is true of false. However, for calculation instructions for which the condition in the IF statement is false, the CPU core does not execute the store instruction "store*" described at the end of the group of instructions and discards the calculation result. The SIMD operation is preformed on all the calculation instructions in the IF statement which are iterated in the DO loop to allow suppression of overheads needed for the SIMD operation. On the other hand, the arithmetic processing is useless when the condition in the IF statement is false. However, when the condition in the IF statement has a high true rate, an increase in efficiency due to the parallel calculation of the iterated calculation instructions in the IF statement by the SIMD operation, overcomes the decrease in efficiency resulting from the useless arithmetic processing. Therefore, in the present embodiment, the masking SIMD operation is desirably performed to increase the efficiency when the true rate of the condition in the IF statement exceeds the threshold.

FIG. 14 is a diagram illustrating an example of operations performed by the SIMD arithmetic units when the object code for the masking SIMD operation is executed. In this case, the CPU core is assumed to have two SIMD arithmetic units. When a variable n1 in the original program 30 in FIG. 13 is assumed to be 10, the IF statement in the DO loop is iterated 10 times. When the 10 calculation instructions are executed in the two SIMD arithmetic units in parallel, the 10 calculation instructions can be executed in five cycles as depicted in FIG. 14. However, each calculation instruction includes a group of a load instruction, a multiplication instruction, an addition instruction, and a store instruction. The final store instruction is executed only when the condition in the IF statement is true. When the condition in the IF statement is false, the final store instruction is not executed, and the calculation result is discarded. Another example of the instruction executed by the masking SIMD operation only when the condition in the IF statement is true is a data transfer instruction. The data transfer instruction is an instruction to transfer the calculation result to a certain address in the memory.

[Listing SIMD Operation]

Now, optimization based on the listing SIMD operation will be described. When the SIMD operation is performed on the calculation instructions in the IF statement in the DO loop, the above-described masking SIMD operation is generally used. However, when the true rate of the condition in the IF statement is equal to or lower than a predetermined threshold, the masking SIMD operation is likely to result in discarding of the calculation result. Thus, an increase in efficiency due to the SIMD operation is overcome by a decrease in efficiency due to execution of useless calculations.

Thus, the computer executes the library program to determine to generate an optimization control line for the listing SIMD operation when the true rate of the condition in the IF statement in the DO loop is lower than the predetermined threshold. In the listing SIMD operation, the computer executes the compiler to convert the DO loop in the original program into a program (object code) with a first loop in which a loop control variable that meets the condition in the IF statement is registered in an array and a second loop which repeats executing the calculation instruction in the IF statement by a size of the array of the loop control variable. As a result, the CPU core executes the object code to carry out calculation instructions identical in number to the rotations in the second loop, in the SIMD arithmetic units in parallel. Since, in the first loop, the values of the loop control variable at which the condition in the IF statement is true are pre-registered, all the calculation instructions executed in the second loop are calculation instructions for the case where the condition in the IF statement is true. Therefore, the listing SIMD operation eliminates useless calculations such as those in the masking SIMD operation even when the true rate of the condition in the IF statement is low. An increase in efficiency due to the SIMD operation overcomes a decrease in efficiency due to the execution of the two loops.

Figure 15:
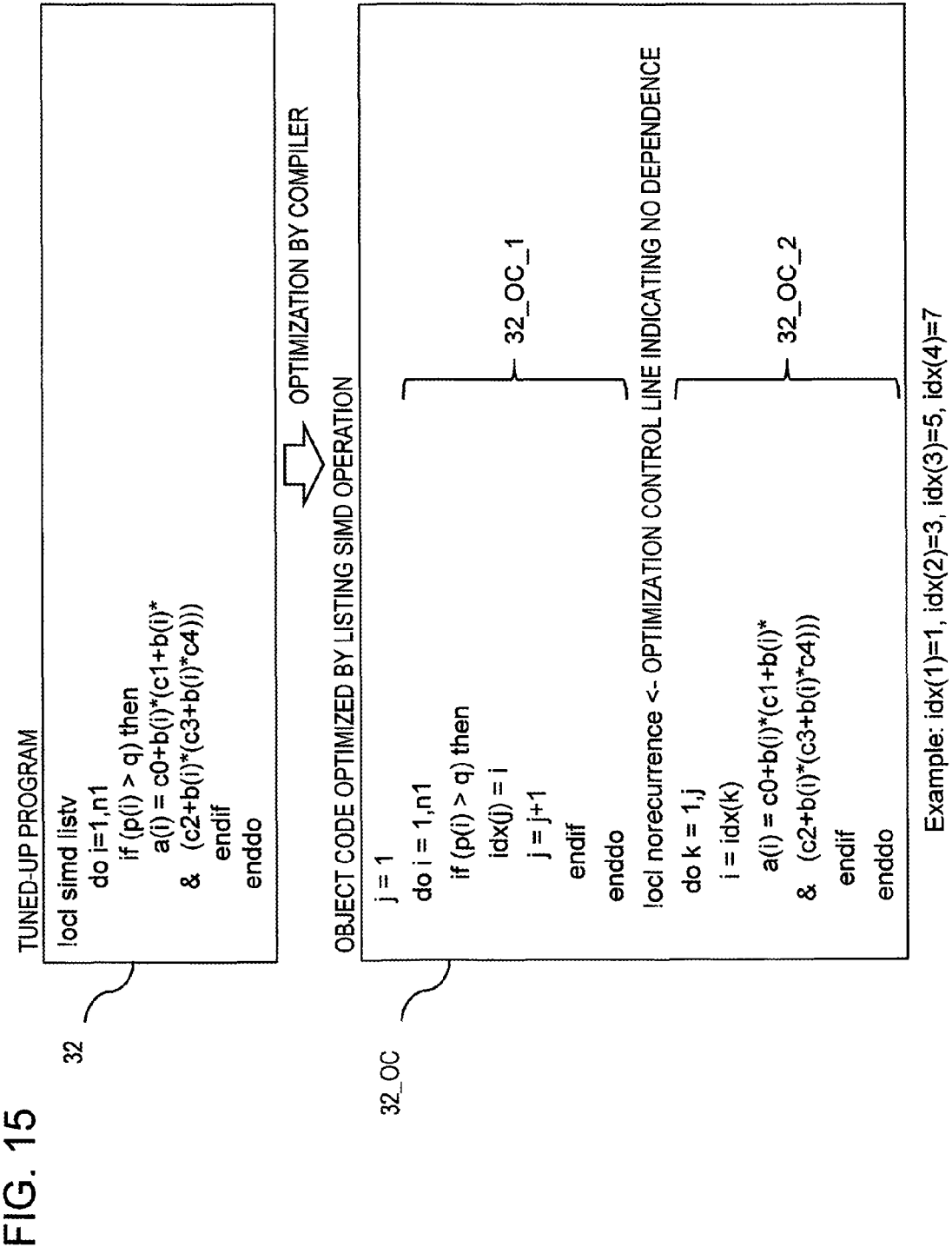
FIG. 15 is a diagram depicting an example of the object code optimized by the listing SIMD operation.

FIG. 15 is a diagram depicting an example of the object code optimized by the listing SIMD operation. FIG. 15 depicts a tuned-up program 32 into which an optimization control line "!ocl simd listv" indicating the listing SIMD operation is interposed and an example of the object code 32_OC optimized by the compiler based on the optimization control line "!ocl simd lists". The object code 32_OC in FIG. 15 is described in the same source code as that for the tuned-up program instead of a binary code to facilitate understanding.

When the optimization control line indicating the listing SIMD operation is interposed, the computer executes the compiler to convert the DO loop in the tuned-up program 32 into a program (object code) 32_OC with a first loop 32_OC_1 in which the values of a loop control variable (i) that meet the condition in the IF statement are registered in an array idx(j) and a second loop 23_OC_2 that performs the calculation instruction in the IF statement by repeating in the number of which is equivalent to the size of the registration array idx(j). Given that the condition p(i)>q in the IF statement in the first loop 32_OC_1 is true when the loop control variable (i) is 1, 3, 5, or 7, the array idx(j) in the second loop 32_OC_2 are idx(1)=1, idx(2)=3, idx(3)=5, and idx(4)=7. Thus, in the second loop, the calculation instruction is iterated only four times, and the calculation results for the calculation instruction are all stored, eliminating useless calculations.

FIG. 16 is a diagram illustrating an example of operations performed by the SIMD arithmetic units when the CPU core executes the object code 32_OC in FIG. 15. The object code 32_OC involves four iterations of the calculation instruction and can be completely executed by two SIMD arithmetic units in two cycles. Moreover, the calculation result is prevented from being needlessly discarded.

As described above, when the condition for execution of the calculation instructions in the IF statement has a low true rate, the listing SIMD operation is performed to optimize the original program. Then, the SIMD operation is performed only on the calculation instructions for the case where the condition is true, and the calculations are executed in parallel. Thus, an increase in efficiency due to the SIMD operation overcomes a decrease in efficiency due to division into the two DO loops, leading to improvement in efficiency as a whole.

[Optimization for a Normal Loop Structure and Optimization for a Loop with a Small Number of Rotations]

The optimization of a loop structure includes, the above-described SIMD operation of executing a plurality of instructions in a plurality of SIMD arithmetic units, an optimization method of performing unrolling expansion on an original program with a loop structure to reduce the number of iterations and a software pipelining optimization method of executing a group of consecutive instructions in parallel using a pipeline structure in the CPU core, to shorten a processing cycle.

However, the above-described optimization based on unrolling expansion or software pipelining fails to increase the efficiency unless the number of iterations of the loop structure has a given value or larger. Even when the compiler converts a loop structure with a small number of iterations into an object code including a loop with unrolling expansion or a loop with software pipelining, a significant increase of the efficiency is not expected, and moreover, a determination step for loop selection due to having a useless loop conversely reduces the efficiency.

Thus, in the present embodiment, the computer executes the library program to perform the SIMD operation on the calculation instructions in the IF statement in the DO loop (S36 and S37) and further to generate an optimization control line that allows the normal optimization to be performed when the loop is iterated a sufficient number of times, while generating an optimization control line that allows optimization for a loop with a small number of rotations when the loop is iterated only a small number of times, as depicted in FIG. 8.

For a tuned-up program into which the optimization control line for the normal optimization is interposed, the compiler generates an object code having a loop in which unrolling expansion is performed to the DO loop in the original program and a loop in which software pipelining expansion is performed in the CPU core.

On the other hand, for a tuned-up program into which the optimization control line for the optimization for a loop with a small number of rotations is interposed, the compiler does not generate the loop in which unrolling expansion is performed or the loop in which software pipelining expansion is performed in the object code.

Figure 17:
FIG. 17 is a diagram illustrating the unrolling expansion.

FIG. 17 is a diagram illustrating the unrolling expansion. FIG. 17 depicts an example of the tuned-up program 32. The tuned-up program 32 has a DO loop with (n) iterations. When the number of the (n) iterations is sufficiently large, the computer executes the compiler to expand one calculation instruction in the DO loop in the tuned-up program 32 into eight calculation instructions to generate an object code 32_OC which is changed such that the DO loop is executed iteratively with the loop control variable (i) changing from 1 to n with 8 incremental. Thus, in the object code 32_OC, the number of iterative rotations of the DO loop is reduced to one-eighth, enabling a reduction in the number of overhead steps needed to iteratively execute the calculation instruction. Furthermore, since the number of calculation instructions in the DO loop is increased to eight, a plurality of SIMD arithmetic units can execute the eight calculation instructions with the SIMD operation during each iteration. This improves the execution efficiency of the program.

However, a condition for successfully increasing the efficiency based on unrolling expansion is that the number of iterations in the DO loop or the remaining number of iterations is at least equal to or larger than the number of unrolling expansions (eight in the example in FIG. 17).

Figure 18:
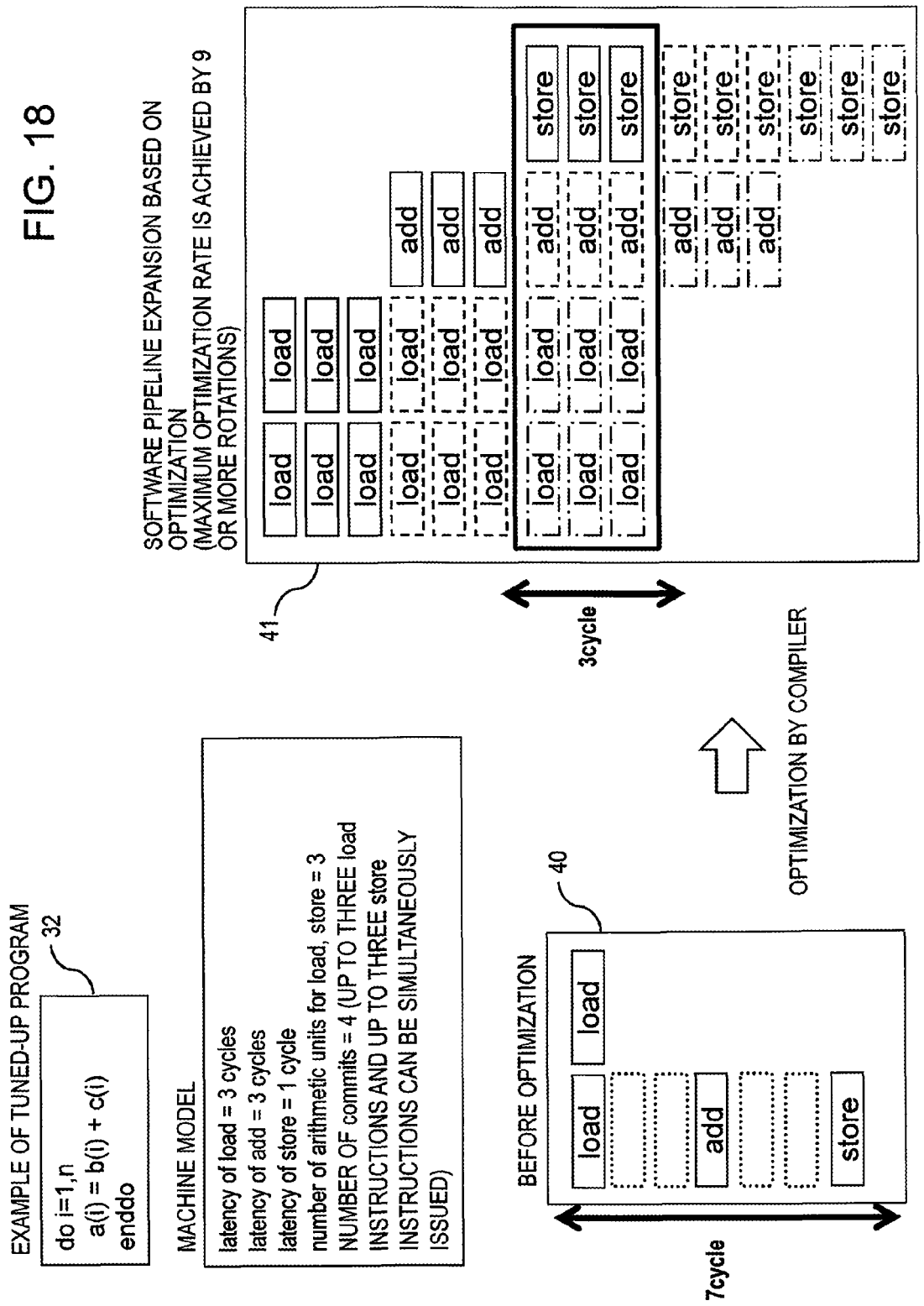
FIG. 18 is a diagram illustrating the software pipelining expansion.

FIG. 18 is a diagram illustrating the software pipelining expansion. An example of the tuned-up program 32 in FIG. 18 is a DO loop that performs (n) iterations of a calculation instruction to add a variable (b) and a variable (c) together and substitute the result into a variable (a). The compiler decomposes such a calculation instruction into an instruction to load the variable (b) from the memory, an instruction to load the variable (c) from the memory, an instruction to add the loaded variables (b) and (c) together, and an instruction to store an addition result (a) in the memory to convert into an object code.

A processor machine model that executes the object code is assumed to be configured as follows: the load instruction "load" has a latency of 3 cycles, the addition instruction "add" has a latency of 3 cycles, the store instruction "store" has a latency of 1 cycle, the number of arithmetic units for the load instruction and the store instruction is three, the number of commits that is the number of instructions that can be reserved in the arithmetic unit is four, but for the load instruction and the store instruction, up to only three instructions can be reserved.

In pipeline expansion examples 40 and 41 in FIG. 18, a vertical direction corresponds to a time axis, and a horizontal direction corresponds to the number of arithmetic units executing instructions.

When the calculation instructions in the tuned-up program 32 are executed one by one in order, the instructions executed by the pipeline in the CPU core are as depicted in the pipeline expansion example 40 that has not been optimized. Seven cycles are needed to execute one calculation instruction. That is, the CPU core executes a pair of load instructions in parallel, then executes the addition instruction when three cycles for the latency of the load instruction have passed, and executes the store instruction when three cycles for the latency of the addition instruction have passed.

In contrast, in the example 41 where software pipelining expansion is performed for optimization, in the pipeline in the CPU core, two arithmetic units in the CPU core, first, consecutively execute a pair of load instructions "load", and after 3 cycles from the beginning, execute the addition instruction "add" to add data (b) and (c) together which are acquired by the initial pair of load instructions, and subsequently continues to execute the addition instructions "add". Moreover, after 6 cycles from the beginning, the arithmetic units execute the store instruction "store" to store data calculated by the first addition instruction, and subsequently continue to execute the store instructions "store". As a result, the pipeline completes nine calculation instructions in 15 cycles. The example 41 distinguishably illustrates three instruction groups represented by solid lines, three instruction groups represented by dashed lines, and three instruction groups represented by alternate long and short dash lines.

In particular, since the number of arithmetic units executing the load instruction and the store instruction is three and the latency of each of the load and store instructions is three cycles, when the number of iterations of the DO loop is nine or more (9=3*3), the most efficient situation can be brought about in which all the arithmetic units execute instructions without the need for calculation waits, as depicted by thick frames in FIG. 18. Therefore, when the number of iterations of the DO loop corresponds to nine or more rotations, software pipelining expansion enables the efficiency to be maximized.

Figure 19:
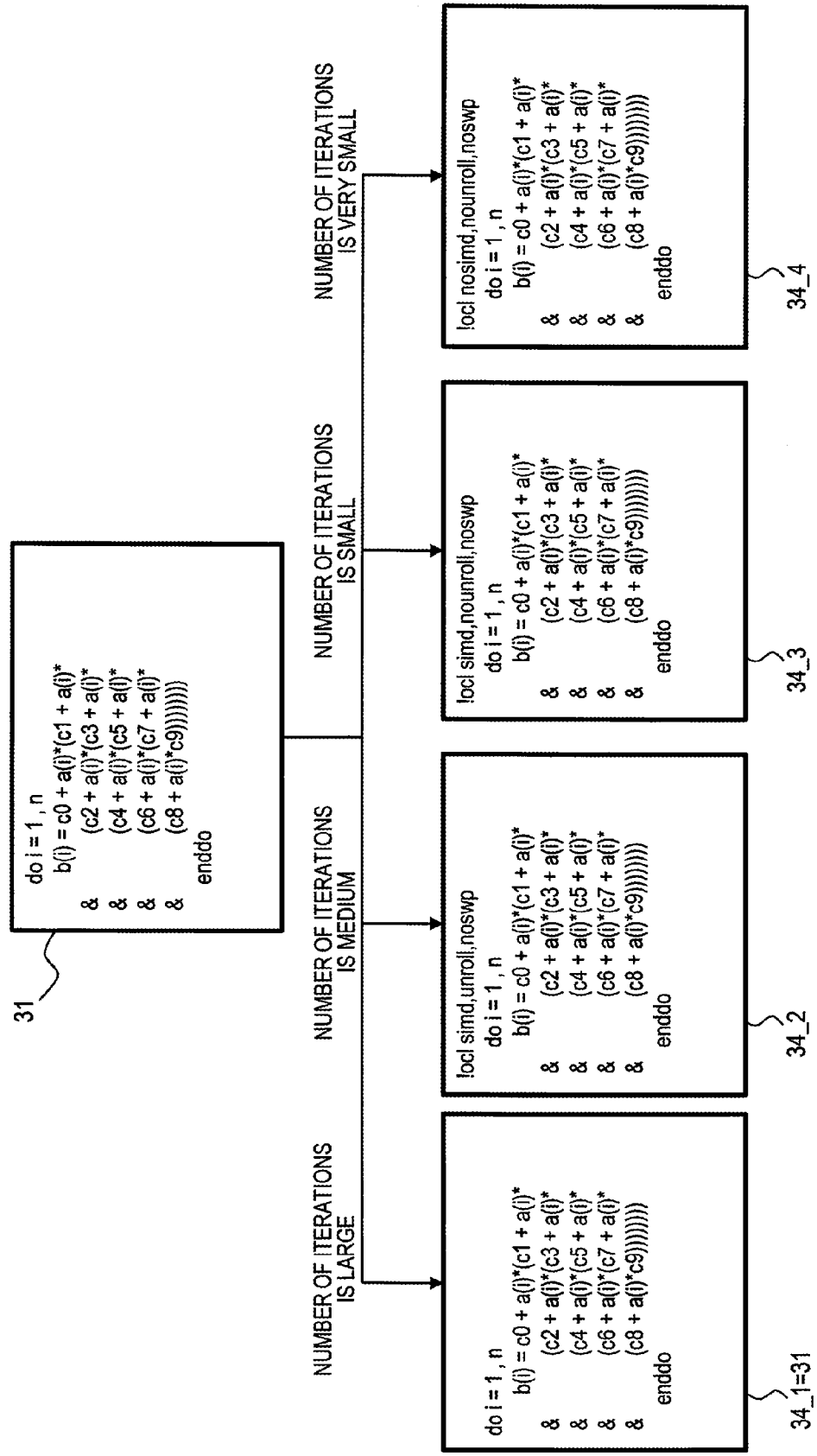
FIG. 19 is a diagram depicting an example of an optimization control line for an original program for a DO loop according to the present embodiment.

FIG. 19 is a diagram depicting an example of an optimization control line for an original program with a DO loop according to the present embodiment. It is assumed that the CPU core has a 2SIMD configuration with two SIMD arithmetic units, that the unrolling expansion involves eight expansions, and that the efficiency of the software pipelining expansion is maximized when the instruction is expanded at least nine. Under these assumptions, a condition, under which an effect of efficiency increase according to 2SIMD operation, eight unrolling expansions, and at least nine software pipelining expansions is expected, is that the number of iterations of the DO loop is at least 2×8×9=144. Furthermore, a condition, under which an effect of efficiency increase according to the 2SIMD operation and eight unrolling expansions is expected, is that the number of iterations of the DO loop is at least 2×8=16. Moreover, a condition, under which an effect of efficiency increase according to only the 2SIMD operation is expected, is that the number of iterations of the DO loop is at least 2.

[Case of a Large Number of Loop Iterations]

Thus, in the example of the optimization control line in FIG. 19, the original program 31 is the same as the original program depicted in FIG. 10B and has a loop with no IF statement in the DO loop and with (n) iterations. The computer executes the library program to acquire runtime information on the DO loop, and determines to generate a tuned-up program 34_1 with nothing interposed therein as an optimization control line when the number of iterations of the DO loop included in the runtime information is large (for example, (n) is 144 or more). The tuned-up program 34_1 corresponds to the original program 31 with no optimization control line interposed therein. In this case, the computer executes the compiler to convert the tuned-up program 34_1 into an object code with a plurality of loops described below.

Figure 20:
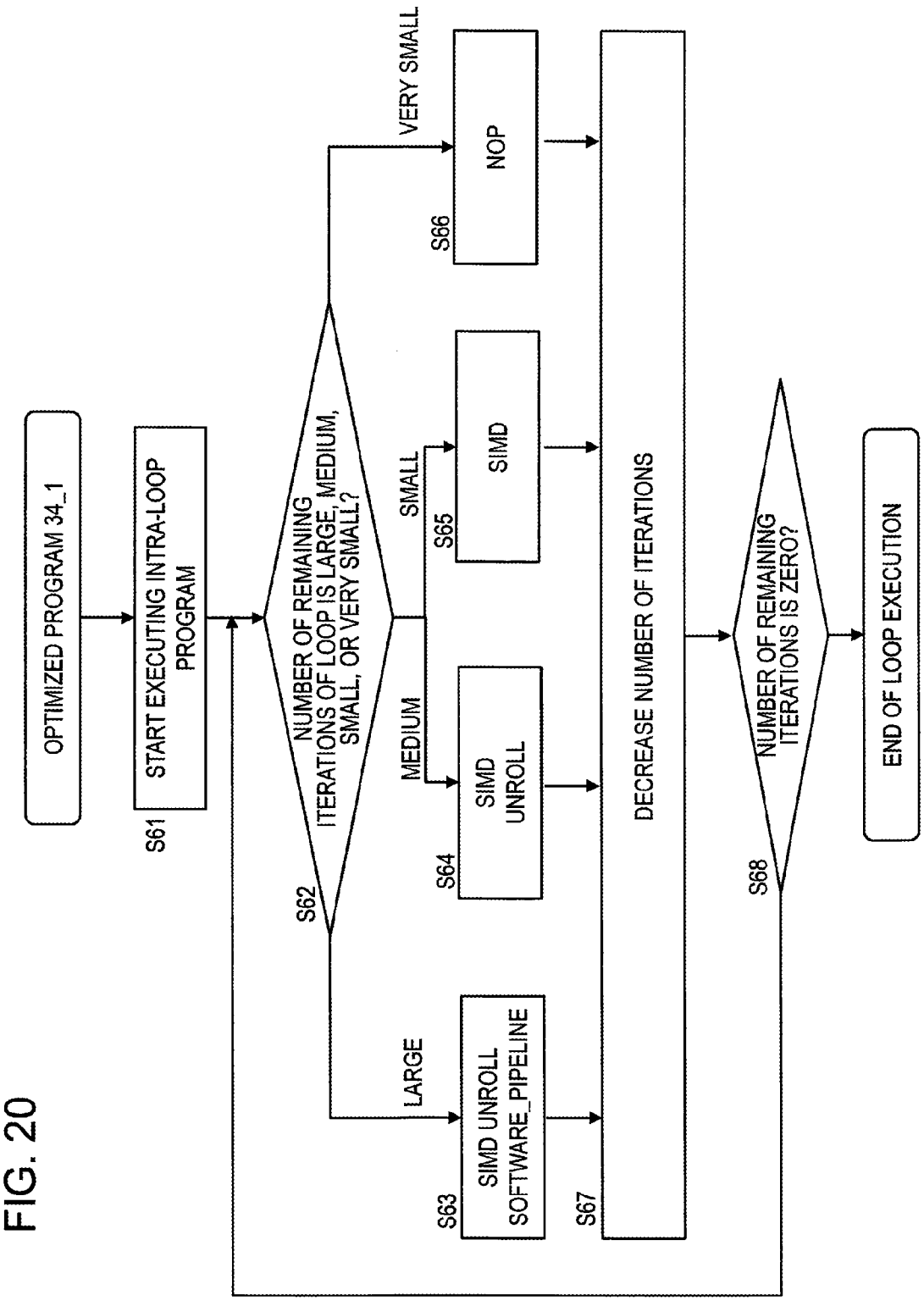
FIG. 20 is a flowchart of an object code with the DO loop optimized when the DO loop is iterated a large number of times.

FIG. 20 is a flowchart of an object code with the DO loop optimized when the DO loop is iterated a large number of times. The object code in FIG. 20 is an object code generated by the computer executing the compiler to optimize the loop in the tuned-up program 34_1 in FIG. 19.

The program of the optimized object code start executing a program in the loop (S61) and carries out any one of four optimization processes (S63 to S66) depending on whether the number of remaining iterations of the loop is large (for example, (n) is 144 or more), medium (for example, (n) is at least 16 and less than 144), small ((n) is at least 2 and less than 16), or very small ((n) is less than 2) (S62).

When the number (n) of remaining iterations of the loop is large ((n) is equal to or more than 144 in S62), the program of the optimized object code executes a loop S63 which performs the 2SIMD operation, the unrolling expansion, and the software pipelining expansion to carry out 144 calculation instructions. When the loop S63 is passed through, 144 is subtracted from the number (n) of remaining iterations of the loop (S67).

When the number (n) of remaining iterations of the loop is medium ((n) is less than 144 and at least 16 in S62) after passing through the optimization loop S63 a predetermined number of times to execute the calculation instructions, the program of the optimized object code executes a loop S64 that performs the 2SIMD operation and the unrolling expansion to carry out 16 calculation instructions. When the loop S64 is passed through, 16 is subtracted from the number (n) of remaining iterations of the loop (S67).

When the number (n) of remaining iterations of the loop is small ((n) is less than 16 and at least 2 in S62) after passing through the optimization loop S64 a predetermined number of times to execute the calculation instructions, the program of the optimized object code executes a loop S65 that performs the 2SIMD operation to carry out two calculation instructions. When the loop S65 is passed through, 2 is subtracted from the number (n) of remaining iterations of the loop (S67).

When the number (n) of remaining iterations of the loop is very small ((n) is less than 2 in S62) after the program of the optimized object code passes through the optimization loop S65 a predetermined number of times to execute the calculation instructions, the program executes a loop S66 that performs none of the operations including the SIMD operation, the unrolling expansion, and the software pipelining expansion, a remaining number of iterations, to carry out a remaining number of calculation instructions. Then, when the number of remaining iterations is zero (S68, YES), the program of the optimized object code ends the execution of the loop.

[Case of a Medium Number of Loop Iterations]

As seen back in FIG. 19, the computer executes the library program to acquire runtime information on the DO loop, and determines to generate a tuned-up program 34_2 with an optimization control line "!loc simd, unroll, noswp" interposed therein when the number of iterations of the DO loop included in the runtime information is medium (for example, (n) is less than 144 and at least 16). For the tuned-up program 34_2, the computer executes the compiler to convert the tuned-up program 34_2 into an object code with a plurality of loops described below.

Figure 21:
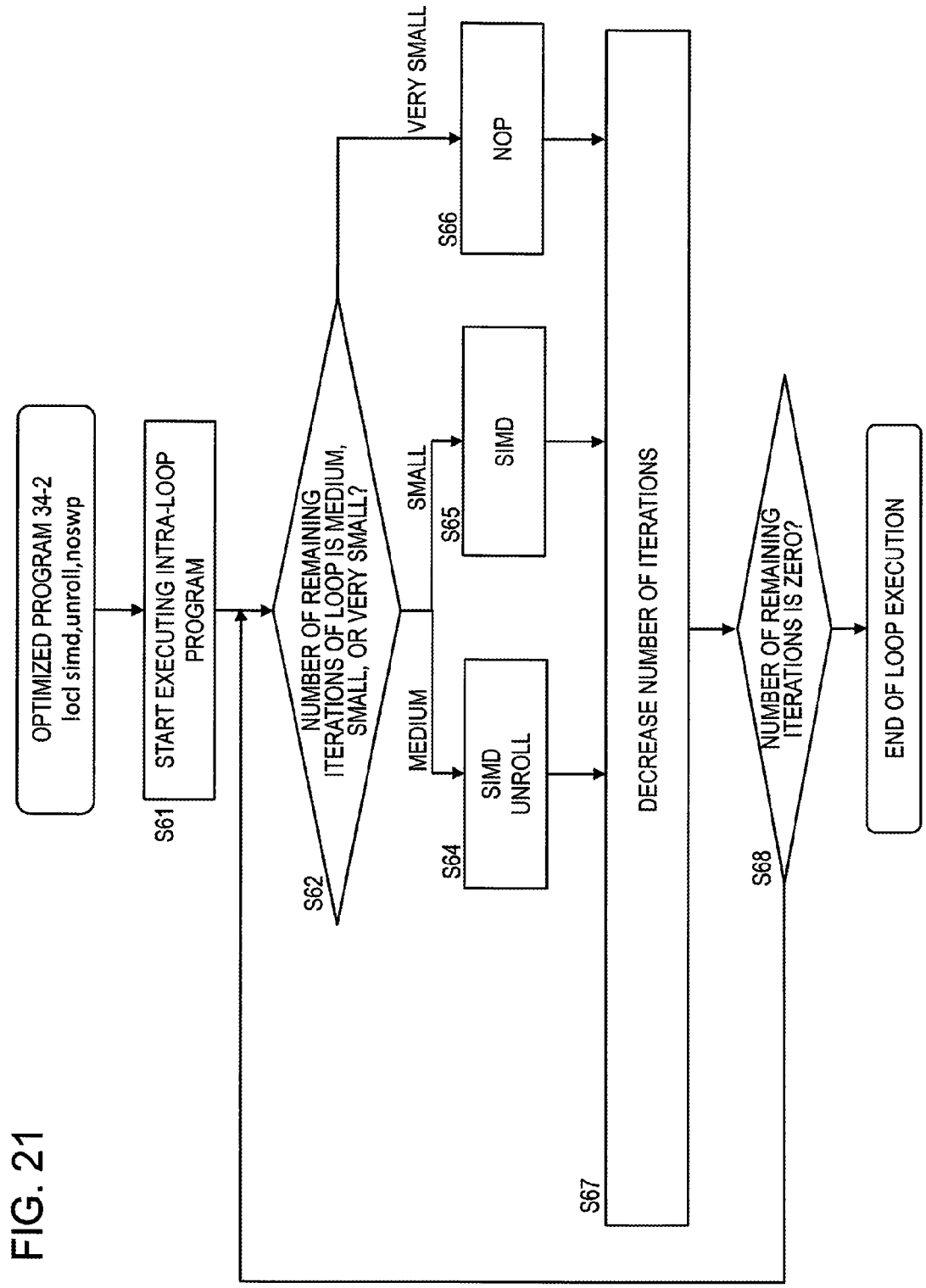
FIG. 21 is a flowchart of an object code with the DO loop optimized when the DO loop is iterated a medium number of times ((n) is less than 144 and at least 16).

FIG. 21 is a flowchart of an object code with the DO loop optimized when the DO loop is iterated a medium number of times ((n) is less than 144 and at least 16). The program of the optimized object code in FIG. 21 is the program of an object code generated by the computer executing the compiler to optimize the tuned-up program 34_2 in FIG. 19.

Unlike in FIG. 20, the program of the optimized object code in FIG. 21 does not have the loop S63 passed through when the number of remaining iterations of the loop is large. This is because the number of remaining iterations of the DO loop is medium ((n) is less than 144 and at least 16), so that the loop S63 is a useless loop.

The program of the optimized object code in FIG. 21 starts to execute a program in the loop (S61) and carries out any one of three optimization processes (S64 to S66) depending on whether the number of remaining iterations of the loop is medium (for example, (n) is at least 16 and less than 144), small ((n) is at least 2 and less than 16), or very small ((n) is less than 2)(S62).

When the number (n) of remaining iterations of the loop is medium ((n) is less than 144 and at least 16 in S62), the program of the optimized object code executes a loop S64 which performs the 2SIMD operation and the unrolling expansion to carry out 16 calculation instructions. When the loop S64 is passed through, 16 is subtracted from the number (n) of remaining iterations of the loop (S67).

When the number (n) of remaining iterations of the loop is small ((n) is less than 16 and at least 2 in S62) after passing through the optimization loop S64 a predetermined number of times to execute the calculation instructions, the program of the optimized object code executes a loop S65 that performs the 2SIMD operation to carry out two calculation instructions. When the loop S65 is passed through, 2 is subtracted from the number (n) of remaining iterations of the loop (S67).

When the number (n) of remaining iterations of the loop is very small ((n) is less than 2 in S62) after the program of the optimized object code passes through the optimization loop S65 a predetermined number of times to execute the calculation instructions, the program executes a loop S66 that performs none of the operations including the SIMD operation, the unrolling expansion, and the software pipelining expansion, a remaining number of iterations, to carry out a remaining number of calculation instructions. Then, when the number of remaining iterations is zero (S68, YES), the program of the optimized object code ends the execution of the loop.

[Case of a Small Number of Loop Iterations]

As seen back in FIG. 19, the computer executes the library program to acquire runtime information on the DO loop, and determines to generate a tuned-up program 34_3 with an optimization control line "!loc simd, nounroll, noswp" interposed therein when the number of iterations of the DO loop included in the runtime information is small (for example, (n) is less than 16 and at least 2). For the tuned-up program 34_3, the computer executes the compiler to convert the tuned-up program 34_3 into an object code with a plurality of loops described below.

Figure 22:
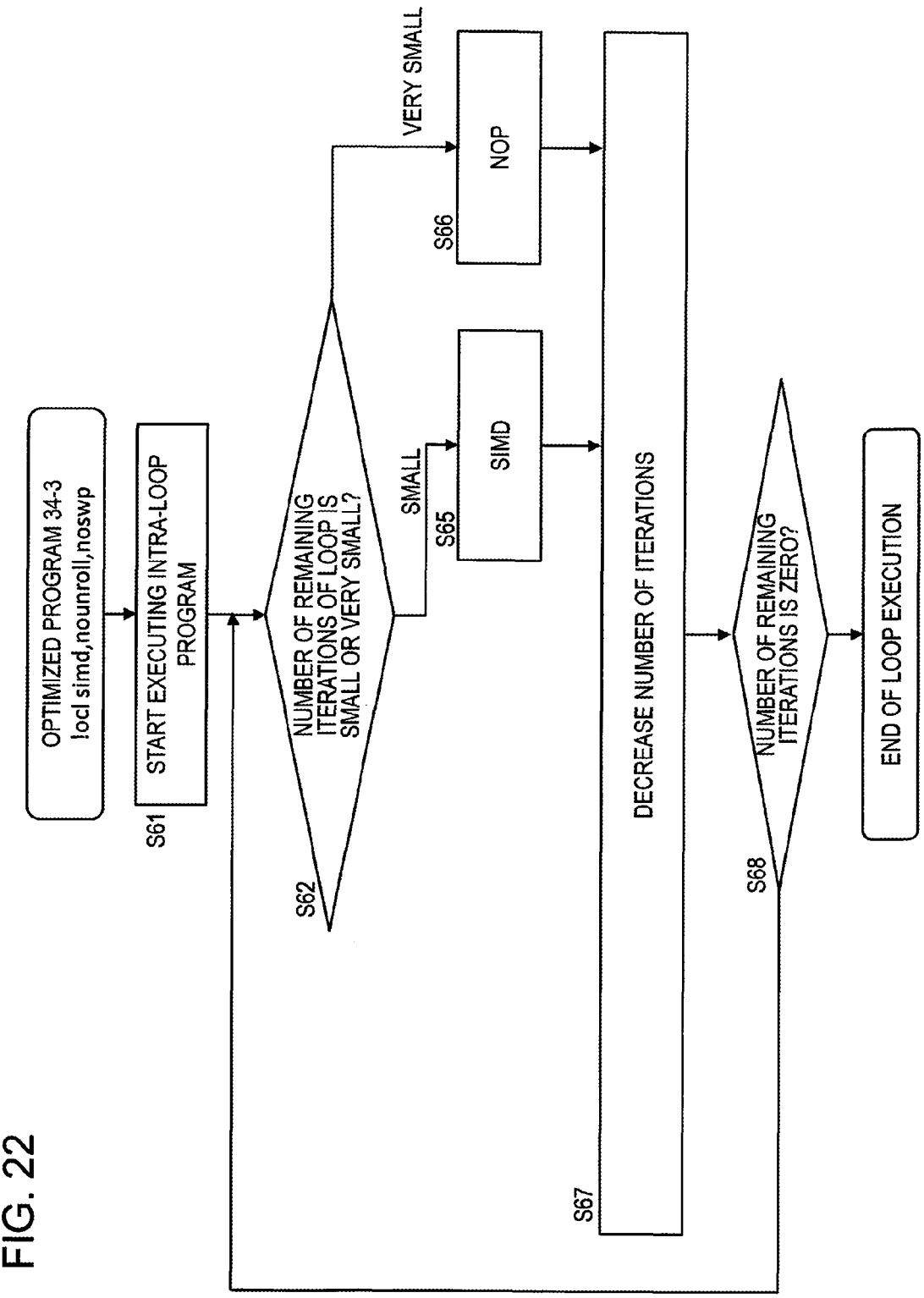
FIG. 22 is a flowchart of an object code with the DO loop optimized when the DO loop is iterated a small number of times ((n) is less than 15 and at least 2).

FIG. 22 is a flowchart of an object code with the DO loop optimized when the DO loop is iterated a small number of times ((n) is less than 15 and at least 2). The program of the optimized object code in FIG. 22 is the program of an object code generated by the computer executing the compiler to optimize the tuned-up program 34_3 in FIG. 19.

Unlike in FIG. 20, the program of the optimized object code in FIG. 22 does not have the loop S63 passed through when the number of remaining iterations of the loop is large or the loop S64 passed through when the number of remaining iterations of the loop is medium. This is because the number of remaining iterations of the DO loop is small ((n) is less than 16 and at least 2), so that the loops S63 and S64 are useless loops.

The program of the optimized object code in FIG. 22 starts to execute an intra-loop program (S61), and carries out one of two optimization processes (S65 and S66) depending on whether the number of remaining iterations of the loop is small (for example, (n) is at least 2 and less than 16) or very small ((n) is less than 2)(S62).

When the number (n) of remaining iterations of the loop is small ((n) is less than 16 and at least 2 in S62), the program of the optimized object code executes a loop S65 which performs the 2SIMD operation to carry out two calculation instructions. When the loop S65 is passed through, 2 is subtracted from the number (n) of remaining iterations of the loop (S67).

When the number (n) of remaining iterations of the loop is very small ((n) is less than 2 in S62) after the program of the optimized object code passes through the optimization loop S65 a predetermined number of times to execute the calculation instructions, the program executes a loop S66 that performs none of the operations including the SIMD operation, the unrolling expansion, and the software pipelining expansion, a remaining number of iterations, to carry out a remaining number of calculation instructions. Then, when the number of remaining iterations is zero (S68, YES), the program of the optimized object code ends the execution of the loop.

[Case of a Very Small Number of Loop Iterations]

As seen back in FIG. 19, the computer executes the library program to acquire runtime information on the DO loop, and determines to generate a tuned-up program 34_4 with an optimization control line "!loc nosimd, nounroll, noswp" interposed therein when the number of iterations of the DO loop included in the runtime information is very small (for example, (n) is less than 2). For the tuned-up program 34_4, the computer executes the compiler to convert the tuned-up program 34_4 into an object code with a plurality of loops described below.

Figure 23:
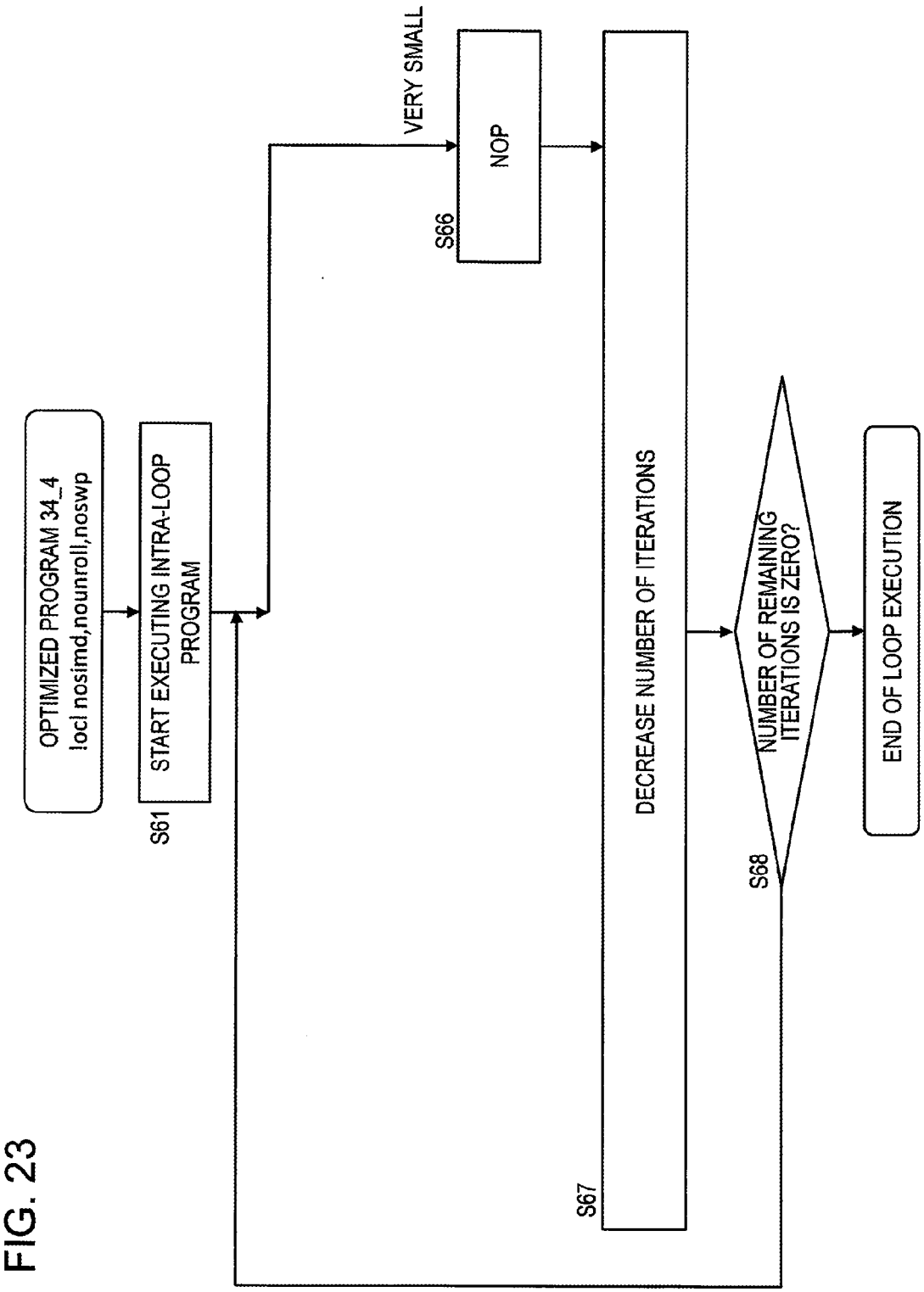
FIG. 23 is a flowchart of an object code with the DO loop optimized when the DO loop is iterated a very small number of times ((n) is less than 2).

FIG. 23 is a flowchart of an object code with the DO loop optimized when the DO loop is iterated a very small number of times ((n) is less than 2). The program of the optimized object code in FIG. 23 is the program of an object code generated by the compiler optimizing the tuned-up program 34_4 in FIG. 19.

Unlike in FIG. 20, the program of the optimized object code in FIG. 23 has none of the loops including the loop S63 passed through when the number of remaining iterations of the loop is large, the loop S64 passed through when the number of remaining iterations of the loop is medium, and the loop S65 passed through when the number of remaining iterations of the loop is small. This is because the number of remaining iterations of the DO loop is very small ((n) is less than 2), so that the loops S63, S64, and S65 are useless loops.

The program of the optimized object code in FIG. 23 starts to execute an intra-loop program (S61), and executes, without making determination based on the number of iterations of the loop, a loop S66 that performs none of the operations including the SIMD operation, the unrolling expansion, and the software pipelining expansion, a remaining number of iterations, to carry out a remaining number of calculation instructions. Then, when the number of remaining iterations is zero (S68, YES), the program of the optimized object code ends the execution of the loop.

Advantages and disadvantages of the program of the optimized object code in FIGS. 20 to 23 will be described. If the number of iterations of the loop is large (equal to or more than 144), when the optimized program in FIG. 20 is executed, all of the loops S63 to S66 are carried out, allowing a plurality of calculation instructions to be efficiently executed based on the software pipelining expansion, the unrolling expansion or SIMD operation. However, the overhead of processing resulting from the determination step S62 for the number of iterations hinders an increase in efficiency. However, an increase in efficiency resulting from the execution of the loop S63 overcomes a decrease in efficiency resulting from the complicated determination step S62, leading to improvement in efficiency as a whole.

If the number of iterations of the loop is medium (less than 144 and at least 16), when the optimized program in FIG. 20 is executed, the loop S63 is not carried out, and thus, the overhead of processing resulting from the determination step S62 for the number of iterations which is executed during every iteration hinders an increase in efficiency. When the number of iterations of the loop is medium, the loop S63, which is definitely not executed, is deleted as in the optimized program in FIG. 21 to allow the determination step S62 for the number of iterations to be simplified, reducing the degree of a decrease in efficiency resulting from the overhead.

If the number of iterations of the loop is small (less than 16 and at least 2), when the optimized program in FIG. 20 is executed, the loops S63 and S64 are not carried out, and thus, the overhead of processing resulting from the determination step S62 for the number of iterations which is executed during every iteration disadvantageously hinders an increase in efficiency. A similar problem arises in the program optimized in FIG. 21. Thus, when the number of iterations of the loop is small, the loops S63 and S64, which are definitely not executed, are deleted as in the optimized program in FIG. 22 to allow the determination step S62 for the number of iterations to be simplified, reducing the degree of a decrease in efficiency resulting from the overhead.

When the number of iterations of the loop is very small (less than 2), only the loop S66 is executed as is the case with the optimized program in FIG. 23 to allow elimination of the determination step S62 for the number of iterations, which is the cause of a decrease in efficiency.

As described above, for a normal DO loop with a very large number of iterations, the program of the optimized object code in FIG. 20 is suitable for an increase in efficiency. However, for a DO loop with a small number of iterations, selection of any one of the programs of the optimized object code in FIG. 21, FIG. 22, and FIG. 23 which is commensurate with the number of iterations is expected to maximize the efficiency.

As seen back in FIG. 3, the computer executes the library program to generate an optimization control line (S14) to output the optimization control line data 22 (S15).

FIG. 24 is a diagram depicting an example of the optimization control line data. The optimization control line data 22 has information on the optimization control line, the name of a target program, a target function, or a target subroutine and the number of a target line into which the optimization control line is interposed. FIG. 24 illustrates, as information on the optimization control line, information on the optimization control line for the masking SIMD operation "!ocl simd", the optimization control line for a loop with small number of iterations "!ocl simd, nounroll, noswp", and the optimization control line for the listing SIMD operation "!ocl simd_listv", As depicted in FIG. 3, the computer executes the tool program to interpose the optimization control line into the original program 30 based on the optimization control line data 22, thus generating a tuned-up program 23.

Moreover, the computer executes the compiler to perform the optimization provided in the compiler based on the optimization control line interposed in the tuned-up program 23, thus converting into an object code executable by the computer. The computer executes the optimized object code based on the optimization control line to allow the original program to be efficiently carried out.

As described above, according to the program optimization method in the present embodiment, when the bottleneck of long calculation wait time is detected in the profile information collected when the original program is executed, the optimum SIMD operation according to the true rate of the IF statement in the loop is performed for the calculation instructions in the IF statement in the loop. This enables a reduction in calculation wait time. Moreover, according to the program optimization method in the present embodiment, when the bottleneck of long calculation wait time is detected, the program is converted into a program of the optimized object code for which the overhead of the determination process which hinders the optimization is suppressed in accordance with the number of iterations of the loop. Thus, the calculation wait time caused by the determination process when the optimized object code is executed is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A program optimization method, executed by an arithmetic processing device, comprising:
   collecting profile information including a runtime analysis result by causing a computer to execute an original program to be optimized;
   calculating a calculation wait time based on the profile information; and
   generating a tuned-up program, when the calculation wait time is longer than a first threshold, by inserting an Single Instruction Multiple Data (SIMD) operation control line that performs an SIMD operation for an instruction in an IF statement in a loop when an SIMD instruction ratio in the loop in the original program is lower than a second threshold;
   wherein the inserting an SIMD operation control line includes inserting a masking SIMD operation control line when a true rate at which a condition for executing the instruction in the IF statement is true, exceeds a third threshold, and inserting a listing SIMD operation control line when the true rate is equal to or lower than the third threshold;

the masking SIMD operation control line causes a compiler to convert the loop of the tuned-up program into an object code which causes a computer to sequentially execute the instruction in the IF statement in SIMD arithmetic units in parallel regardless of a condition of the IF statement and to discard an execution result for a case where the condition of the IF statement is not true; and the listing SIMD operation control line causes the compiler to convert the loop of the tuned-up program into an object code including a first loop that causes a computer to register, in an array, values of a loop control variable when the condition of the IF statement is true, and a second loop that causes a computer to rotates the loop with the loop control variables registered in the array to execute the instructions in the IF statement.

2. The program optimization method according to claim 1, wherein the generating the tuned-up program further includes when the calculation wait time is longer than the first threshold, inserting an optimization control line for a first number of rotations when the number of iterations of the loop is equal to or smaller than a fourth threshold, and inserting an optimization control line for a second number of rotations when the number of iterations of the loop exceeds the fourth threshold;

the optimization control line for the first number of rotations causes a compiler to convert the loop of the tuned-up program into an object code which does not include an execution loop for pipeline expansion in which a CPU core executes pipeline processing for the instruction in the loop or an execution loop for unloading expansion in which the instruction in the loop is expanded into plurality of the instructions; and the optimization control line for the second number of rotations causes the compiler to convert the loop of the tuned-up program into an object code which includes the execution loop for the pipeline expansion or the execution loop for the unloading expansion.

3. The program optimization method according to claim 1, wherein the generating the tuned-up program further includes when the calculation wait time is longer than the first threshold, inserting an optimization control line for a first number of rotations when the number of iterations of the loop is equal to or smaller than a fourth threshold, and inserting an optimization control line for a second number of rotations when the number of iterations of the loop exceeds the fourth threshold;

the optimization control line for the first number of rotations causes the compiler to convert the loop of the tuned-up program into an object code which does not include an execution loop for pipeline expansion in which a CPU core executes pipeline processing for the instruction in the loop or an execution loop for unloading expansion in which the instruction in the loop is expanded into plurality of the instructions; and the optimization control line for the second number of rotations causes the compiler to convert the loop of the tuned-up program into an object code which includes the execution loop for the pipeline expansion or the execution loop for the unloading expansion.

4. A non-transitory computer-readable storage medium storing a optimization program therein for causing a computer to execute a process comprising:

collecting profile information including a runtime analysis result by causing a computer to execute an original program to be optimized;

calculating a calculation wait time based on the profile information; and generating a tuned-up program, when the calculation wait time is longer than a first threshold, by inserting an Single Instruction Multiple Data (SIMD) operation control line that performs an SIMD operation for an instruction in an IF statement in a loop when an SIMD instruction ratio in the loop in the original program is lower than a second threshold;

wherein the inserting an SIMD operation control line includes inserting a masking SIMD operation control line when a true rate at which a condition for executing the instruction in the IF statement is true, exceeds a third threshold, and inserting a listing SIMD operation control line when the true rate is equal to or lower than the third threshold;

the masking SIMD operation control line causes a compiler to convert the loop of the tuned-up program into an object code which causes a computer to sequentially execute the instruction in the IF statement in SIMD arithmetic units in parallel regardless of a condition of the IF statement and to discard an execution result for a case where the condition of the IF statement is not true; and the listing SIMD operation control line causes the compiler to convert the loop of the tuned-up program into an object code including a first loop that causes a computer to register, in an array, values of a loop control variable when the condition of the IF statement is true, and a second loop that causes a computer to rotates the loop with the loop control variables registered in the array to execute the instructions in the IF statement.

5. A program optimization apparatus comprising:

a collecting unit configured to collect profile information including a runtime analysis result by causing a computer to execute an original program to be optimized:

a calculator configured to calculate a calculation wait time based on the profile information; and a generator configured to generate a tuned-up program, when the calculation wait time is longer than a first threshold, by inserting an Single Instruction Multiple Data (SIMD) operation control line that performs an SIMD operation for an instruction in an IF statement in a loop when an SIMD instruction ratio in the loop in the original program is lower than a second threshold;

wherein the inserting an SIMD operation control line includes inserting a masking SIMD operation control line when a true rate at which a condition for executing the instruction in the IF statement is true, exceeds a third threshold, and inserting a listing SIMD operation control line when the true rate is equal to or lower than the third threshold;

the masking SIMD operation control line causes a compiler to convert the loop of the tuned-up program into an object code which causes a computer to sequentially execute the instruction in the IF statement in SIMD arithmetic units in parallel regardless of a condition of the IF statement and to discard an execution result for a case where the condition of the IF statement is not true; and the listing SIMD operation control line causes the compiler to convert the loop of the tuned-up program into an object code including a first loop that causes a computer to register, in an array, values of a loop control variable when the condition of the IF statement is true, and a second loop that causes a computer to rotates the loop with the loop control variables registered in the array to execute the instructions in the IF statement.

6. The program optimization apparatus according to claim 5, wherein the generator is configured to, when the calculation wait time is longer than the first threshold, insert an optimization control line for a first number of rotations when the number of iterations of the loop is equal to or smaller than a fourth threshold, and insert an optimization control line for a second number of rotations when the number of iterations of the loop exceeds the fourth threshold.

* * * * *